(12) United States Patent
Elad et al.

(10) Patent No.: US 8,027,945 B1
(45) Date of Patent: *Sep. 27, 2011

(54) INTELLIGENT PORTAL ENGINE

(75) Inventors: Joseph B. Elad, Claymont, DE (US);
Apperson H. Johnson, Wilmington, DE (US); David S. Cleaver, Newark, DE (US); Daniel L. Chester, Newark, DE (US); Keith S. Decker, Hockessin, DE (US); Thomas A. Roper, Quincy, MA (US); Irene H. Philips, Newark, DE (US)

(73) Assignee: Kalano Meui HI, Limited Liability Company, Dover, DE (US)

( * ) Notice: Subject to any disclaimer, the term of this patent is extended or adjusted under 35 U.S.C. 154(b) by 802 days.

This patent is subject to a terminal disclaimer.

(21) Appl. No.: 11/503,826

(22) Filed: Aug. 14, 2006

Related U.S. Application Data

(63) Continuation of application No. 09/919,702, filed on Jul. 31, 2001, now Pat. No. 7,092,928.

(60) Provisional application No. 60/221,976, filed on Jul. 31, 2000.

(51) Int. Cl.
*G06N 5/02* (2006.01)
(52) U.S. Cl. .............................. 706/47; 706/12
(58) Field of Classification Search .................... 706/47, 706/12
See application file for complete search history.

(56) References Cited

U.S. PATENT DOCUMENTS

| | | | |
|---|---|---|---|
| 4,974,191 A | 11/1990 | Amirghodsi et al. | |
| 5,201,034 A | 4/1993 | Matsuura et al. | |
| 5,252,951 A | 10/1993 | Tannenbaum et al. | |
| 5,363,473 A | 11/1994 | Stolfo et al. | |
| 5,748,974 A | 5/1998 | Johnson | |
| 5,819,243 A | 10/1998 | Rich et al. | |
| 5,835,087 A | 11/1998 | Herz et al. | |
| 5,855,002 A | 12/1998 | Armstrong | |
| 5,887,120 A | 3/1999 | Wical | |
| 5,890,117 A | 3/1999 | Silverman | |
| 6,026,388 A | 2/2000 | Liddy et al. | |
| 6,088,731 A | 7/2000 | Kiraly et al. | |
| 6,192,338 B1 | 2/2001 | Haszto et al. | |

OTHER PUBLICATIONS

Dennis Perzanowski ("Interbot: Natural Language and Gesturing in a Robotic Environment" Jul. 28, 1999).*
Decker et al ("Intelligent Adaptive Information Agents" 1996).*
Decker et al ("Intelligent Agents in portfolio management" Oct. 1996).*
Pack et al ("A software architecture for integrated service robot development" 1997 IEEE).*

(Continued)

*Primary Examiner* — Jeffrey A Gaffin
*Assistant Examiner* — Lut Wong
(74) *Attorney, Agent, or Firm* — Schwabe, Williamson & Wyatt, P.C.

(57) ABSTRACT

A human-computer interface system and methods for providing intelligent, adaptive, multimodal interaction with users while accomplishing tasks on their behalf in some particular domain or combination of domains. Specifically, this system accepts user input via natural language text, mouse actions, human speech, whistles, gestures, pedal movements, facial or postural changes, and conveys results via natural language text, automatically-generated speech, and displays of graphs, tables, animation, video, and mechanical and chemical effectors that convey heat, tactile sensation, taste and smell.

50 Claims, 17 Drawing Sheets

OTHER PUBLICATIONS

Nathaniel Good et al., "Combining Collaborative Filtering with Personal Agents for Better Recommendations," Proceedings of the 1999 Conference of the American Association of Artificial Intelligence (AAAI-99), 1999, pp. 439-446.

Dennis Perzanowski et al., "Using a natural language and gesture interface for unmanned vehicles," Proceedings of the Society of Photo-Optical Instrumentation Engineers, vol. 4024, 2000, pp. 341-347.

Daphne Koller et al., "Probabilistic frame-based systems," Proceedings of the fifteenth National Conference on Artificial Intelligence, 1998, pp. 580-587.

George Ferguson et al., "Generic Plan Recognition for Dialogue Systems," ARPA Workshop on Human Language Technology, Mar. 21-23, 1993, 7 pgs.

A.F. Dragoni et al., "Distributed Belief revision as Applied Within a Descriptive Model of Jury Deliberations," Information and Communications Technology Law, vol. 10, No. 1, Mar. 2001, 7 pgs.

Boris Katz et al., "Integrating Web Resources and Lexicons into a Natural Language Query System," Proceedings of the IEEE International Conference on Multimedia Computing and Systems, vol. II, 1998, pp. 1-7.

S. Seneff et al., "Multimodal Discourse Modelling in a Multi-user Multi-domain Environment," Proceedings of the Fourth International Conference on Spoken Language Processing, 1996, pp. 192-195.

Dennis Perzanowski, "Interbot: Natural Language and Gesturing in a Robotics Environment," Navy Center for Applied Research in Artificial Intelligence, 1999, 4 pgs.

Valentina A.M. Tamma et al., "Supporting different inheritance mechanisms in ontology representations," Department of Computer Science, The University of Liverpool, 2000, 4 pgs.

"An Overview of the Start System," http://www.ai.mit.edu/projects/infolab/start-system, last accessed Mar. 20, 2002, 3 pgs.

Douglas B. Lenat, "CYC: A Large-Scale Investment in Knowledge Infrastructure," Communications of the ACM, Nov. 1995, vol. 38, No. 11, pp. 32-38.

James Allen et al., "An Architecture for a Generic Dialogue Shell," Journal of Natural Language Engineering 6(3), Dec. 2000, pp. 1-16.

Boris Katz, "From Sentence Processing to Information Access on the World Wide Web," AAAI Technical Report SS-97-02, 1997, pp. 77-86.

H.S. Delugach et al., "Wizard: A Database Inference Analysis and Detection System," IEEE Transactions on Data and Knowledge Engineering, vol. 8, No. 1, Feb. 1, 1996, pp. 56-66.

* cited by examiner

FIG. 14

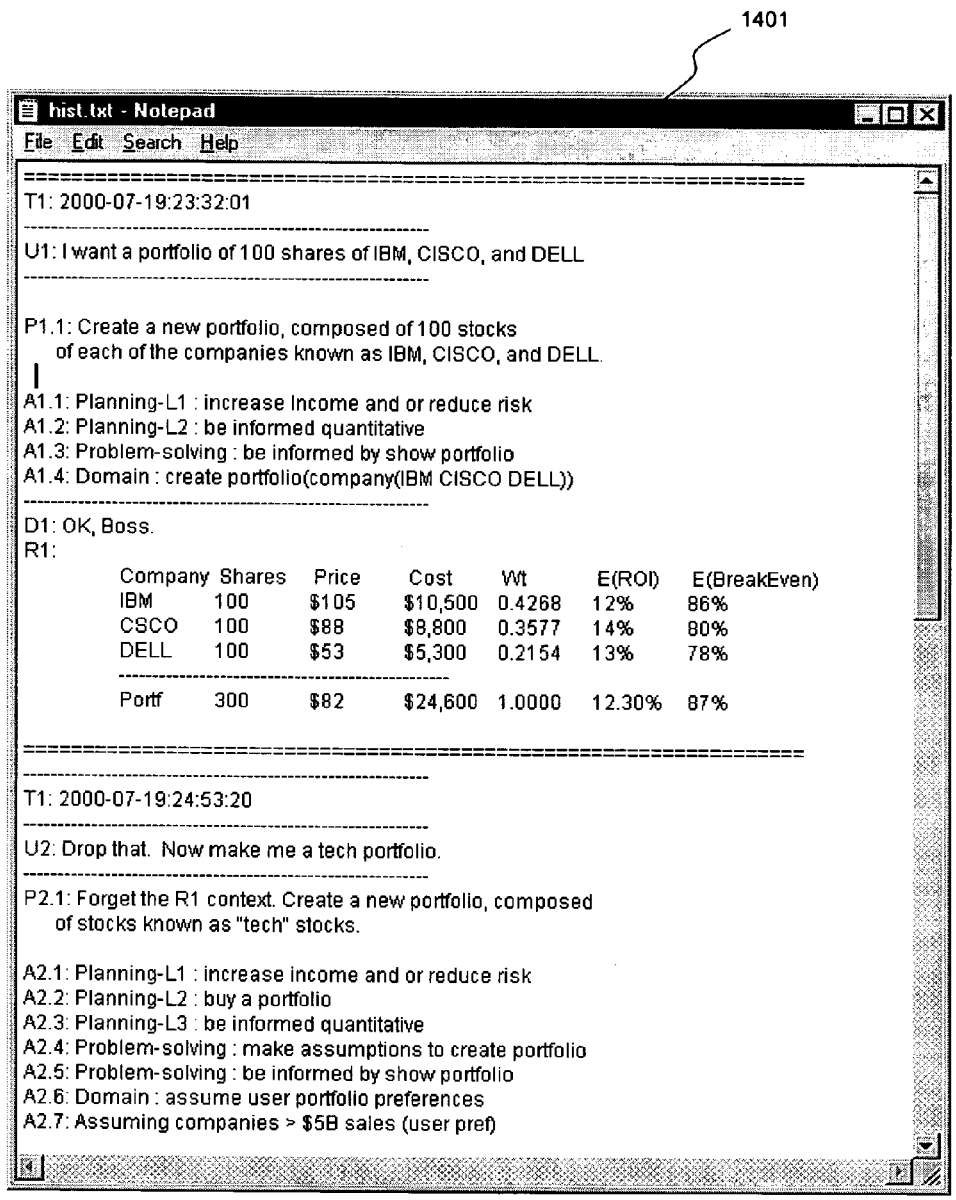

```
hist.txt - Notepad
File  Edit  Search  Help
================================================================
T1: 2000-07-19:23:32:01
----------------------------------------------------------------
U1: I want a portfolio of 100 shares of IBM, CISCO, and DELL
----------------------------------------------------------------

P1.1: Create a new portfolio, composed of 100 stocks
     of each of the companies known as IBM, CISCO, and DELL.

A1.1: Planning-L1 : increase income and or reduce risk
A1.2: Planning-L2 : be informed quantitative
A1.3: Problem-solving : be informed by show portfolio
A1.4: Domain : create portfolio(company(IBM CISCO DELL))
----------------------------------------------------------------
D1: OK, Boss.
R1:
        Company Shares  Price   Cost     Wt      E(ROI)  E(BreakEven)
        IBM     100     $105    $10,500  0.4268  12%     86%
        CSCO    100     $88     $8,800   0.3577  14%     80%
        DELL    100     $53     $5,300   0.2154  13%     78%
        ----------------------------------------------------
        Portf   300     $82     $24,600  1.0000  12.30%  87%

================================================================
----------------------------------------------------------------
T1: 2000-07-19:24:53:20
----------------------------------------------------------------
U2: Drop that. Now make me a tech portfolio.
----------------------------------------------------------------
P2.1: Forget the R1 context. Create a new portfolio, composed
     of stocks known as "tech" stocks.

A2.1: Planning-L1 : increase income and or reduce risk
A2.2: Planning-L2 : buy a portfolio
A2.3: Planning-L3 : be informed quantitative
A2.4: Problem-solving : make assumptions to create portfolio
A2.5: Problem-solving : be informed by show portfolio
A2.6: Domain : assume user portfolio preferences
A2.7: Assuming companies > $5B sales (user pref)
```

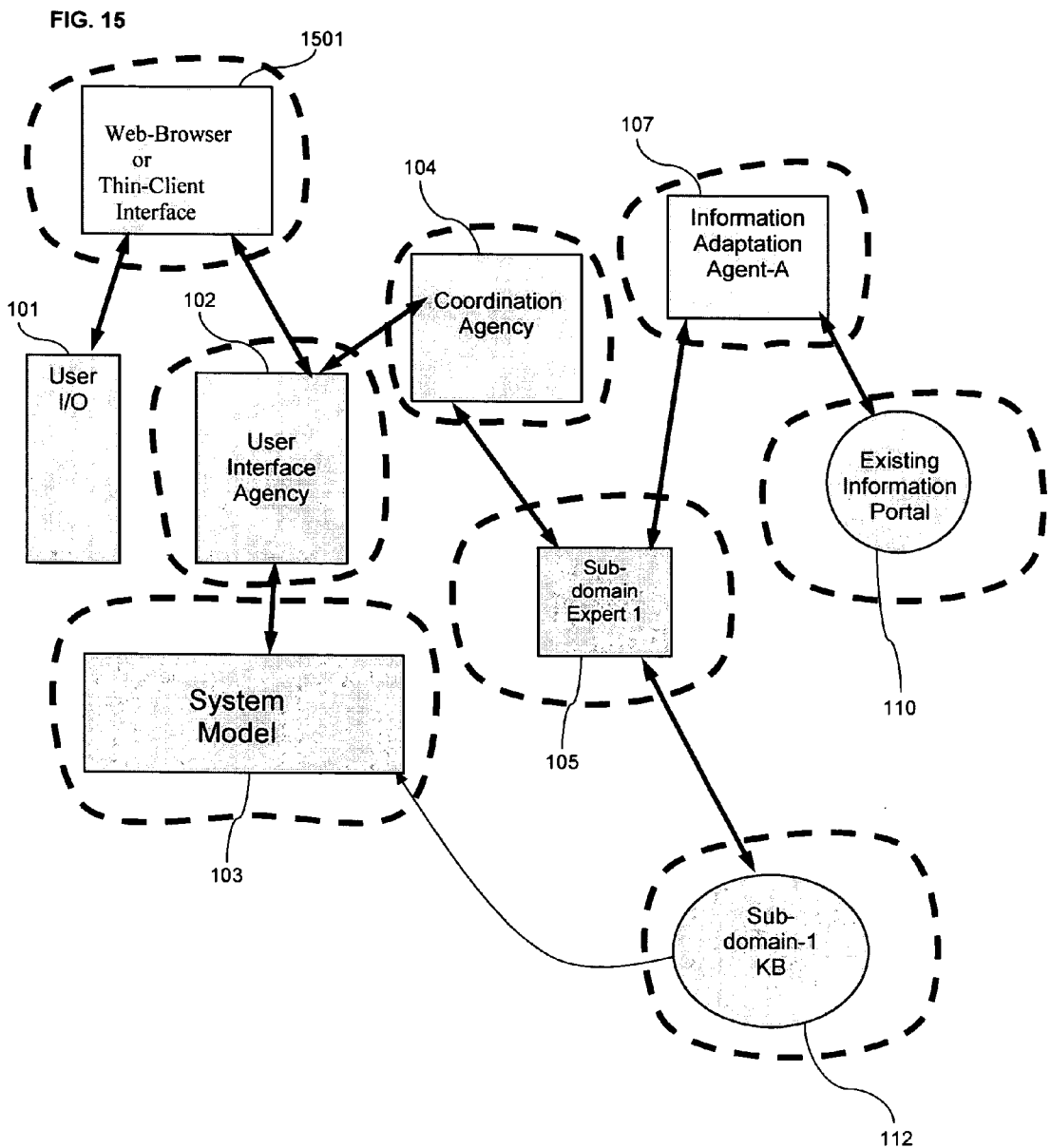

FIG. 16

Simplified Strength/Necessity Belief Calculus

?X = Coffee if:
    ?X is in a mug   (s = .2; n = 0)
    ?X is a hot liquid (s = .4; n = 0)
    ?X is brown     (s = .6; n = .97)
    ?X is not tea    (s = .3; n = 1)

S = Strength; N = Necessity; B = Belief; D = Disbelief;
P = Belief measure of premise (input)

Belief Evaluation Recurrence Formulae :

$B_{x+1} = B_x + (1 - B_x) * S_{x+1} * P_{x+1}$  ; with $B_0 = 0$
$D_{x+1} = D_x + (1 - D_x) * N_{x+1} * (1 - P_{x+1})$  ; with $D_0 = 0$
Conclusion = $B_n * (1 - D_n)$ ;

Example A. $B_4 = 0.8656$,
given all 4 preconditions known to be true with absolute certainty.

Example B. $B_4 = 0.7648$, $D_4 = 0.485$,
          Conclusion = 0.393872,
given that we are only 50% sure that the liquid is brown, but are convinced of all other facts (e.g. because the light is very dim....)

FIG. 17

Bayesian Belief Calculus -

Bayes's rule states that :

$p(A | B)$ = Prob of event A, given event B
= $(p(A) * p(B | A)) / p(B)$

If we know the probabilities $B_i$ for *every* way that A may be realized, we may write:

$$p(A) = \sum p(A | B_i) \, p(B_i)$$

Which allows a straightforward way to compute likelihood, when all possibilities are accounted for.

We can construct networks which relate Bayesian likelihood to various conditions. For example, consider the case where we are given $p(D)$ = probability of planning for retirement = 0.2, and
$p(M | D)$ = probability of asking about mutual Funds, given D, = 0.7.

Now we can construct a graph of probabilistic influences that can be inferred:

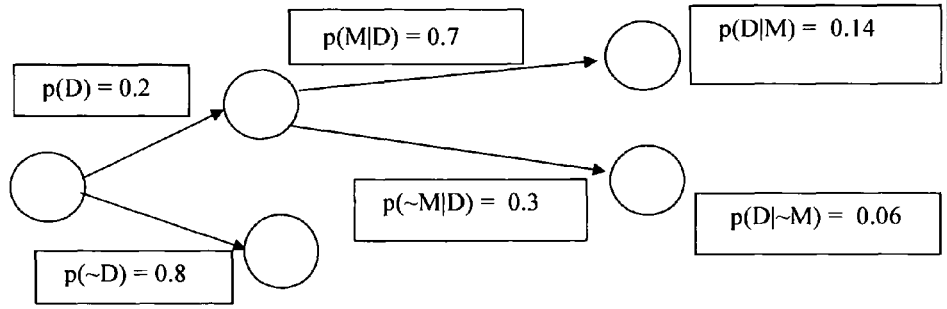

This mechanism can be used to connect the probabilities of various plans and alternatives, and to infer likely plans from various communications.

INTELLIGENT PORTAL ENGINE

This application is a continuation of application Ser. No. 09/919,702 filed Jul. 31, 2001 now U.S. Pat. No. 7,092,928, which is based on U.S. Provisional application No. 60/221,976, filed Jul. 31, 2000. These two applications are hereby incorporated herein by reference.

TECHNICAL FIELD OF THE INVENTION

The present invention relates to user interfaces and to systems accessible via computer mediation, particularly to a multimodal interface to a particular domain or a composition of domains or sub-domains. By multimodal, we mean any means of conveying user input to the computer, and any means of informing the user of facts and results that ensue from his interaction. By domains, and sub-domains, we mean a cohesive region of discourse and activity. For instance, "financial planning" is a potential domain, and "investment portfolio analysis" is a sub-domain in the "financial planning" domain. Obviously, a sub-domain can, potentially, support more than one domain, and typically each domain is comprised of several sub-domains. Also, Sub-domains may be cascaded, recursively, to any level of specificity. A typical commercial use of this technology would be to provide a better user interface to the services and knowledge available via the Internet. Another typical use would be to interact with applications on a personal computer. A third typical use would be to query and control a large, complex system, such as a chemical plant, especially in time of emergency, when normal modes of interaction are too slow to be effective.

BACKGROUND OF THE INVENTION

Users of computer-mediated resources always have particular goals when accessing those resources. The goals may be sharp (learn address of company) or fuzzy (be entertained) may be temporary (find a restaurant) or persistent (achieve and maintain financial independence), and may consist of multiple related or independent sub-goals. Constructing accurate models of a user's goals is a critical prerequisite to providing intelligent interaction with that user. Unfortunately, there is no monolithic, domain-independent body of knowledge that can accurately supply enough information concerning likely user mental states, to make a universal interface practical. In fact, every new capability that becomes available modifies the set of potential goals, plans, and tasks that is relevant to discourse. Consequently, a static set of models can never be satisfactory for long. User goals with respect to a given domain are tightly related to tasks that may be accomplished in that domain and to the referents or objects of those tasks. Thus, an ideal system would utilize domain specific (or sub-domain-specific) information to infer the user's mental state from his interaction, and would support easy addition of such information to an existing interface. Additionally, to be helpful, a user interface must consider the history of interaction, including previous user signals, goals and their outcomes, and must consider the information that was recently disclosed to the user, and the various ways of referring to that information. While the invention is applicable to all forms of human/computer communication, the main theoretical underpinnings are to be found in verbal discourse phenomena. Most of the following description refers to verbal discourse, but the invention contemplates applicability to virtually all non-verbal discourse as well, including mouse-actions, gestures, winks, etc. Similarly, system outputs are shown as text, tables, and graphs, but can also include generated speech, audible tones, blinking lights, and arbitrary transducers that stimulate sensory organs of the user.

Few previous computer interface systems have attempted to deduce user goals and intent, as this is a very difficult task requiring a sophisticated representation of the domain of discourse, of the user, and of the way that language is used for the given domain. Additionally, most systems are forced to ignore the context of interactions, as they do not provide a full representation of the user's previous communications, and of the information that resulted from prior interaction. Another area that other systems have neglected is that of providing users with a visual depiction of the reasoning which takes place as their communications are analyzed and interpreted. Such a visual depiction provides useful feedback for users, while simultaneously giving them an opportunity to fine-tune the system's understanding by directly reinforcing or disputing a particular assumption. No other invention disclosed to date has applied the full capability of multilevel discourse modeling to multimodal inputs, or created multimedia responses consistent and appropriate to the full spectrum of user interests and system capabilities.

Note that in much of the following discussion, the terms value, parameter, attribute, variable, and binding are used as follows:

- A value is some state that is typically of interest to a software process or a human user. A value may be either a scalar or a collection.
- A variable is a label for a unit whose value may change. The label may be used to designate something which will be interpreted as a parameter, or something which will be interpreted as an attribute.
- A binding is the (temporary, or limited in scope) assignment of a value to a variable.
- A parameter is a variable that has a particular meaning to a software process or software system or to a human. Parameters are typically communicated by position, but they may be communicated by association with some name.
- An attribute is a named variable that has a particular meaning to a software process or software system or to a human. Attributes are typically communicated by name, but may be represented by position.
- It is possible for an attribute which is used as a parameter to be bound to a value.

Often, in referring to attributes, parameters, and variables, practitioners use the words metonymically in that any these terms may be used to refer to the value currently bound to the term. For instance, the sentence: "The parameter p was 3." means that the parameter p was bound to the value 3. Similarly, the sentence "Expertise-level was 7.3." means that the attribute 'Expertise-level' was bound to the value 7.3.

Several patents have addressed the meaning of text in human-computer discourse. For example, U.S. Pat. No. 5,255,386 to Prager presents a method and apparatus for intelligent help that matches the semantic similarity of the inferred intent, one of the few systems that attempts to consider user intent. The system is directed to a single and limited arena of providing help for users of computer systems. U.S. Pat. No. 5,255,386 omits a facility for domain modeling, discloses no way for composing domain knowledge, and provides no means capturing and generalizing previous or expert interactions. Prager's disclosure describes only a single, limited weighting scheme to infer best matches of potential meanings, while the invention we describe can exploit any appropriate combination of belief calculus methods to calculate the user's likely intent.

U.S. Pat. No. 6,009,459, to Belfiore, et al. describes an intelligent automatic searching for resources in a distributed environment and mentions "determining the meaning of text" in several different areas. However, the specification discloses no mechanism to represent the potential goals and intentions of a user, and describes only a surface-level syntactic analysis of the user's text, rendering the system incapable of exhibiting intelligent behavior.

U.S. Pat. No. 6,178,398 to Peterson, et al. discloses a method, device and system for noise-tolerant language understanding. This reference also mentions determination of "meanings" from input text, but is directed at correction of ill-formed input via a match function induced by machine learning techniques. However, Peterson uses no explicit domain or user model.

U.S. Pat. No. 6,006,221 to Liddy, et al. provides a multilingual document retrieval system and method using semantic vector matching, but the representation of domain knowledge in this case is merely a correlation matrix which stores the relative frequency with which given pairs of terms or concepts are used together. Also, no attempt is made to understand the unique context of the user, beyond knowing which language (e.g. English v. French) he or she is using.

Another aspect of the present invention is the language used in human-computer discourse behavior which several patents have addressed. For instance, U.S. Pat. No. 4,974,191 to Amirghodsi, et al. disclose an adaptive natural language computer interface system that uses cryptographic techniques, as well as heuristics, to map users input into the language used to control a computer program or robotic system. The system fails to achieve the requisite robustness because it is attempting to match the surface aspects of input language to output language, with no attempt to represent the meaning of the communication or the intentions of the user.

U.S. Pat. No. 5,682,539 to Conrad, et al. provides an anticipated meaning natural language interface, which is used to add a natural language interface to a computer application. The system provides no mechanism for modeling the user or the domain (beyond that of the particular application) so it cannot be used for the broad range of tasks that users wish to accomplish.

U.S. Pat. No. 5,870,701 to Wachtel describes a control signal processing method and apparatus having natural language interfacing capabilities. However, Wachtel only describes the facility to represent the surface parse of natural language input; it does not represent or consider the meaning or intention of the user who communicated that input.

U.S. Pat. No. 5,987,404 to Della Pietra, et al. recounts a statistical natural language understanding using hidden clumpings. U.S. Pat. No. 5,987,404 uses any of a variety of statistical models to learn the likely meaning of language from examples. However, the Della Pietra system has no way of relating those mappings to a model of the user, his thoughts and intentions, and to the communications peculiar to a given domain, or to the recent history of discourse.

U.S. Pat. No. 6,081,774 to de Hita, et al. discloses a natural language information retrieval system and method that consists mainly of a database to permit parsing of terms that are not easily recognized by simple morphological analysis and dictionary lookup. However, it includes no mechanism for representing domain knowledge, discourse plans and goals, or (conversational) problem-solving approaches, nor any way to compose multiple domain knowledge sources into a single repository. Thus, it does not enable or use prerequisite information to accurately assess the goals, intentions and meanings of users.

Recently, U.S. Pat. No. 6,138,100 to Dutton, et al., discloses a voice-activated connection which parses very limited verbal commands, but does not include a model of user's possible goals in a domain, or mention any mechanism to create such an explicit representation. Without such representation, and the capability of drawing inferences about user intentions, the system will never be capable of behaving as if it understands natural language queries and statements U.S. Pat. No. 6,192,338 to Haszto, et al. described natural language knowledge servers as network resources, an invention which acts as an intermediary between the user and various web resources. This system supports some distribution of the knowledge used in interpreting the user's requests, but lacks a model of the user, his goals, or intentions. The system also lacks a model of the domain which is independent of the particular web servers with which it communicates. Because of this deficiency, the system is unable to understand requests that span multiple web servers, or to accomplish the tasks that will satisfy such requests.

An additional feature of the present invention is its multimodal capabilities. In the present context, multimodal refers to any means of conveying user input to the computer, and any means of informing the user of facts and results that ensue form his interaction. Several inventions have explored limited multimodal interactions with limited success compared with the present invention. For example, U.S. Pat. No. 5,748,841 to Morin, et al. describes a supervised contextual language acquisition system, which is aimed at teaching a user the application-specific language of a particular computer application, rather than generalized understanding and fulfillment of user requests in a broad domain. The system uses some historical model of the user and accepts a limited subset of natural language input, but lacks a model of the goals that a user might possess, the mapping of those goals to language, or to the concepts that can be referred to in a domain, beyond the strict limits of a single software application.

U.S. Pat. No. 5,781,179 to Nakajima, et al. presents a multimodal information inputting method and apparatus for embodying the same, and describes a scheme for correlating the actions of a user-directed cursor to language that is spoken concurrently. Nakajima does not, however, include any method for understanding the meaning and intentions of the user.

U.S. Pat. No. 5,748,974 to Johnson describes a multimodal natural language interface for cross-application tasks. However, this reference focuses primarily on spoken, typed or handwritten communications from users, and lacks any deep model of discourse and similarly lacks a domain model beyond the Application Programmer Interfaces (APIs) of various programs the user might want to control.

US Application 20040122653 to Mau, et al., describes a method for "linking a natural language input to an application" using a "semantic object" to resolve ambiguity. Architecturally, the Mau application includes one "application object model" for each application that is to be included, but fails to offer a mechanism for independent applications to provide linguistic or pragmatic items to the interface system. Mau also fails to support multi-modal signals from the user, fails to generalize the many useful forms of output signals to the user. Mau, et al., also fails to exploit a discourse model to infer user intentions.

US Application 20040044516 to Kennewick, et al. describes system to answer natural language queries that exploits "domain agents" to "receive, process, and respond" to a command, and exploits a history of user statements. Kennewick's architecture but fails to offer a mechanism for independent applications to provide linguistic or pragmatic items to the interface system, fails to automatically compose those items associated with different applications, and fails to support arbitrary users signals.

US Application 20030144977 to Suda, et al. describes an "information processing system which understands information and acts accordingly". Suda's system exploits a model of individual users, and helps them to accomplish computer-related tasks. Suda's system, unlike the instant invention, presumes a monolithic "understander", which interprets user text in terms of a model of user intentions. This approach lacks the scalability and maintainability of our invention, as the system does not obtain task and language information incrementally from individual applications.

US Application 20020111786 to Sugeno et al. describes an "everyday language-based computing system and method", which achieves user goals via a "network-oriented language operating system". After Sugeno's system has interpreted a user input, it works by searching for an application and loading that application into the operating system. In contrast to the instant invention, Sugeno's applications are not responsible for describing the tasks and related linguistic and pragmatic elements which relate to the tasks that they can accomplish.

U.S. Pat. No. 6,604,090 to Tackett, et al. describes a "system and method for selecting responses to user input in an automated interface program", which interprets user input with respect to a set of pre-defined categories, and uses an intermediate language, "gerbil script" to control "virtual robots" on the user's behalf. Tackett's system thus lacks the extensibility of the current invention, which supports composition of new linguistic and pragmatic items at any time, and also permits the users to directly create scripts in their original language or in paraphrase.

U.S. Pat. No. 6,578,019 to Suda, et al. describes an "information processing system which understands information and acts accordingly". Suda's system exploits a model of individual users, and helps them to accomplish computer-related tasks. Suda's system, unlike the instant invention, presumes a monolithic "understander" that interprets user text in terms of a model of user intentions. This approach lacks the scalability and maintainability of our invention, as the system does not obtain task and language information incrementally from individual applications.

U.S. Pat. No. 6,772,190 to Hodjat, et al. describes a "distributed parser of natural language input", which uses a multi-agent approach to parsing, wherein various specialized agents each attempt to interpret the input. Unlike the current invention, Hodjat offers no composition of the association among users, tasks, linguistic and pragmatic items. Lacking the ability to compose models, Hodjat's distributed parser will not scale well in situations where the set of tasks and applications is frequently changing. Additionally, Hodjat's system fails to support signals, other than text and speech, from the user, and also fails to generalize the many useful forms of output signals to the user.

U.S. Pat. No. 6,829,603 to Chai, et al. describes a "system, method and program product for interactive natural dialog" which allows more than one mode of input, and uses a correspondence between "customer taxonomies" and "business taxonomies" to accomplish tasks for a user. Unlike the instant invention, Chai's system does not support the automatic composition of new linguistic or pragmatic items from applications as they become available to the system, thus limiting its scope to "manually integrated" information systems.

In addition to the cited references, there has been research conducted in this area and several published works. For example, An architecture for a generic dialogue shell, by Allen, et al. proposed "generic dialogue shell" which has design goals similar to those of the current invention. One weakness of Allen's shell is that the knowledge about a particular domain and the language, concepts, potential tasks, and constraints of that domain are separated from the modules that weigh particular interpretations of user utterances. This approach renders it impossible to maintain the requisite modularity among different facets of functionality and language. Additionally, Allen's shell offers no support for modalities other than speech, and lacks a model of the traits of the user with respect to particular domains or sub-domains. Another shortcoming of Allen's shell is that there is no provision to use a variety of belief-calculus techniques to determine the most appropriate interpretations or the style of reasoning about a given domain. Thus, potential interpretations within that domain is not an independent quality that can be delegated to some generic parser or discourse manager. Another useful innovation that Allen's architecture lacks is the ability to determine the appropriateness of an interpretation by actually performing it. In many cases, this "trial by execution" approach can resolve ambiguity quickly and accurately.

Cyc: A Large-Scale Investment in Knowledge Infrastructure, a work by Lenat, takes a widely differing approach, and may, at some point become a complementary technology. The Lenat work consists of the CYC knowledgebase, which is an effort to construct enough of the concepts and relations about commonly encountered domains, to perform what is termed "commonsense reasoning" or reasoning which is NOT confined to a particular domain or sub-domain. The CYC effort has been accumulating and encoding knowledge for about sixteen years, and may eventually, offer a practical framework for accessing multi-domain functionality. It is clear that the availability and success of the CYC knowledgebase would ultimately broaden the area of applicability of the current invention, as portions of CYC could be accessed through the World Model Agency of the current invention, and that knowledge could help the discourse planner to reason about plausible user goals and intentions.

As has been described in recent papers, Doran, Loehr, and colleagues at MITRE have been constructing a portable dialog manager that uses an information state approach, as opposed to dialog management by recognizing plans and goals. Though there are some advantages to this approach reducing model complexity, the MITRE approach does not support automatic construction of a model-based interpreter via composition of new linguistic or pragmatic items.

J. Glass, E. Weinstein, et al., describe a conversational interface constructed on top of MIT/opensource "GALAXY" architecture. This approach has been used successfully to provide question-answering for spoken inputs, but, so far, it has been limited to "hard coded" domains. That is, unlike the current invention, the galaxy-based system cannot automatically construct an inference system from linguistic and pragmatic items collected from component applications.

Nederhof and Satta describe a new approach to probabilistic parsing which exploits probabilistic context free grammars, and constructs resulting probabilistic push-down automata to accomplish the parse. The approach they describe relies purely on information about "likely" productions, and, unlike the instant invention, offers no way to directly incorporate information derived from the domain of discourse, or from a history of transitions among domains.

Dan Klein, D., Manning, C., describe a different probabilistic parsing approach, which applies the A* algorithm to extension of paths within the parse. While this approach appears to have achieved good performance, it still does not provide a mechanism to consider probabilistic domain information, or dynamic user profile information, which, in the instant invention, aids in the selection of appropriate parses.

Therefore, while several attempts have been made at creating computer interface systems, few have attempted to deduce user goals and intent. Therefore, there remains a need for a system that deduces user goals and intent while providing a full representation of the user's previous communications, the information that resulted from prior interaction, as well as a visual depiction of the reasoning which takes place as their communications are analyzed and interpreted. None of the prior art has disclosed an invention that fully exploits discourse modeling and flexible inference of user's beliefs, intentions and goals to achieve appropriate interpretations of multimodal inputs or to organize output signals in a way appropriate to a user's history and preferences.

BRIEF SUMMARY OF THE INVENTION

The invention provides an integrated combination of several innovative aspects to aid users of computer-mediated resources, including:

1. A standard way of modeling user goals, intentions, beliefs, assumptions, preferences, and changes of state with respect to a specific domain or composition of domains.

2. A way of inferring a users goals, intentions, beliefs, assumptions, preferences, and changes of state incrementally from elements of discourse.

3. A method for composing vocabulary, grammar, idioms, parameters, goals, assumptions and focusing information associated with independent applications, from several domains or sub-domains in order to provide interpretation of users input with respect to those domains.

4. A method dynamically maintaining a map of domain and domain transition adjacency, and using that map as an aid to plan recognition and focus-recognition.

5. A method for determining the likely meaning of ill-formed input, based on partial matches, plausible user intentions, discourse history, aggregated user models, and the domain adjacency map.

6. A method for modeling discourse which is extensible to all modes of communication with users.

7. A method for adapting the interactive capabilities of a system to a population of users, to sub-populations of users, and to individual users.

8. A means of providing simple, unambiguous references to complex items that are communicated from user to a computer and from a computer to a user, by tagging each turn of discourse with number, time, entity, focus, medium, and a variety of attributes and their bindings.

9. A means of communicating the suppositions of a discourse system to a user, permitting the user to improve the performance of the system by signaling agreement or disagreement with particular suppositions, rating plans and actions by their danger or irreversibility, and using such ratings to control the generation of paraphrases and requests for confirmation.

10. A means of making complex information from large, online sources more useful to users by displaying only the information that contributes to the goals they are trying to accomplish.

11. A means of capturing expert patterns of use, creating libraries, packages, and explanations of those patterns, and a way of transmitting expert behavior patterns to novice users, by portraying expert event sequences.

12. A method for invoking several parse-related tasks concurrently, in order to examine their feasibility and results, in order to derive the likely meaning of a user input.

13. A method for constructing canonical paraphrases that reduces ambiguity by choosing terms and constructions unique to a given sub-domain.

Specifically, the present invention provides in a computing device such as a computer system having processing resources such as one or more processors, one or more memory units, an input device and an output device, a method for deducing user goals and for executing at least one task to accomplish user goals. In one embodiment, the present invention provides a method comprising computer implemented steps of: (a) representing at least one of a user's goals, beliefs, assumptions, preferences, and changes of state with respect to a specific domain or composition of domains, (b) representing the tasks which may be accomplished in particular domains, and at least one of the vocabulary, idioms, or goals that correspond with those tasks, (c) representing human/system transactions in discourse between entities, (d) inferring at least one of users goals, beliefs, assumptions, preferences, and changes of state incrementally from elements of discourse, domain models, and results of previous interactions, (e) recognizing user input as an attempt to accomplish goals in one or more levels of discourse, (f) executing at least one task corresponding to at least one user goal; and (g) optionally conveying related information to the user. In one embodiment, the method is performed by the one or more processors executing instructions which are stored on a storage medium.

In another embodiment, the present invention provides in a computer system having multiple processors or multiple virtual processors, a method for constructing a user interface to at least one independent software component, and for performing at least one task for at least one user involving at least one domain, comprising computer implemented steps of: (a) representing at least one user feature with respect to the domain wherein the user feature is at least one selected from the group consisting of goals, intentions, beliefs, assumptions, preferences, and changes of state; (b) representing at least one task for the at least one independent software component, which can be accomplished in the domain, and associating the task with at least one linguistic or pragmatic item selected from the group consisting of vocabulary, grammar, idioms, parameters, goals, and assumptions; (c) associating the at least one linguistic or pragmatic item with the user feature; (d) using the association for inferring at least one appropriate software component for performing the task for the user; and (e) distributing the representation of the user feature or the representation of the task or the association or the inference or the performance of the task among the multiple processors or memory units.

In yet another embodiment, the present invention provides in a computer system having a processor, a memory unit, an input and output device, a method for inferring at least one meaning of a user's actions with respect to at least one independent software component, involving at least one domain, comprising computer implemented steps of: (a) representing at least one user feature with respect to the domain, wherein the user feature is at least one selected from the group consisting of goals, intentions, beliefs, assumptions, preferences, and changes of state; (b) representing at least one task for the at least one independent software component, which can be accomplished in the domain, and associating the task with at least one linguistic or pragmatic item selected from the group consisting of vocabulary, grammar, idioms, parameters, goals, and assumptions; (c) associating the at least one at least one linguistic or pragmatic item with a meaning of the user's actions; (d) associating the at least one linguistic or pragmatic item with the user feature; and (e) using at least one association from (c) and at least one association from (d), for inferring the meaning of the user actions with respect to an appropriate software component.

BRIEF DESCRIPTION OF THE DRAWINGS

FIG. 14 provides an example history excerpt from human/system interaction.

FIG. 15 shows an alternative assignment of functions to processors or clusters of processors.

FIG. 16 shows an example of Simplified Strength/Necessity Belief Calculus.

FIG. 17 shows an example of Bayesian Network Belief Calculus.

DETAILED DESCRIPTION OF THE INVENTION

Figure 1:
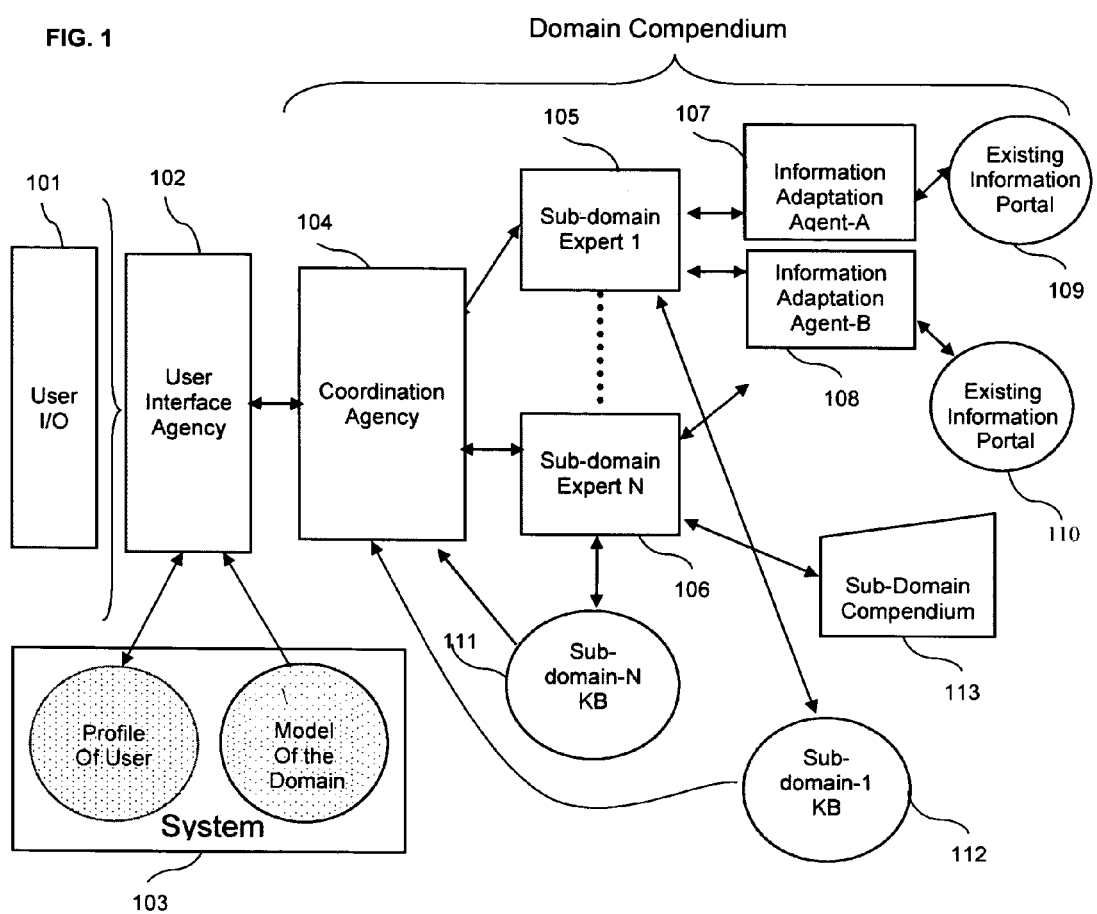
FIG. 1 shows a high-level view of the system of the present invention.

The core of this system consists of modules that model users beliefs, assumptions, state-changes, goals, plans, preferences, and focus with respect to a core grammar and a composition of domain-specific referents, idioms, focusing clues, tasks and information sources. The system exploits the robustness and parallelism availed by recent software approaches to efficiently infer the user's goals and intentions, aid in the attainment of those goals, and communicate results and informative comments effectively.

First, the underlying technologies on which the system is built are described. Next, the design philosophy that is imbued in the architecture of the invention is described. Finally, the major components of the preferred embodiment of the system and the flow of information through the components are described. Once the system is described, several examples are provided showing system interaction. Throughout the description, user input, user signal, utterance, user statement, etc. are used interchangeably. It is convenient to use these terms, even when we are regarding multimodal input. For instance, a user's rotating of the head in the horizontal plane has the same meaning as the utterance "no". Thus, terminology common to verbal discourse is intended to apply also to non-verbal discourse.

Several terms of art used in the description:
    ACL—Agent Communication Language—a communication scheme to transfer information among agents in a multi-agent system
    API—Applications Programming Interface
    KQML—Knowledge Query and Manipulation Language, an ACL
    FIPA—Foundation for Intelligent Physical Agents—another, more recent, ACL
    Markup Language—A scheme for annotating or structuring a document, typically in human-readable form, but aimed primarily at software parsers, rather than human readers
    XML—Extensible Markup Language—a markup language intended to be a universal format for structuring information
    DOM—Document Object Model—a platform and language-neutral standard API for manipulating XML document trees
    TAG—Tree Adjoining Grammar-a grammar formalism that enables modular grammar development and efficient parsing for natural languages
    XTAG—leXicalized Tree Adjoining Grammar—an implementation of the TAG formalism, combined with an associated parser, developed by the researchers at the University of Pennsylvania.
    Intelligent Portal Engine (IPE)—the current invention In constructing the system of the present invention, a number of recently developed software approaches were used. To achieve robustness and scalability (improved performance via parallel processing) a multi-agent system approach to distributing the knowledge and the tasks required of the system was used. In particular, the present system uses the DECAF (Distributed, Environment-Centered Agent Framework) system, which provides built-in support for high-level modeling of complex agencies, for rapid development and modification of agent systems, and for monitoring and debugging the resulting software constructs. Agents within the DECAF system communicate via KQML or FIPA messages, which allows interoperability with many other agent-system architectures. Particular strengths of DECAF include its support for coordination among agents, for expressing agent plans, and for scheduling agent tasks. Throughout the description of the invention, when an agent or agency of a particular type is mentioned, it should be understood that it is not the only such agent or agency in the system. Duplicates or work-a-likes may be invoked to gain speed via parallel processing capabilities and to gain robustness in the event that some particular subsystem were to fail to respond quickly.

To represent domain-specific and general meta-knowledge, and to support queries from multiple agents, the present invention incorporates an ontology server technology that associates a session context with each respondent, and uses backward chaining (horn clause) and forward chaining rules to deduce facts implicit in the knowledge base. This system is augmented with probabilistic certainty factors, to express facts that are not completely known, and with the ability to represent hypothetical conditions.

To represent both the core language and domain specific language, the system uses a lexicalized tree-adjoining grammar (LTAG) approach, similar to the XTAG system developed at the University of Pennsylvania. This approach provides efficient parsing of natural language, a well-considered and well-tested core grammar, and extensibility to new domains and idioms.

Finally, the present invention exploits machine learning techniques in two areas. The first application of machine-learning techniques is in determining the confidence factors for various interpretations of inputs. Initially, system designers participate in a supervised training session wherein they ascribe different a priori probabilities to various possible interpretations of input that correspond to sub-domain tasks. The machine learning system creates a model that predicts the (human-rated) probability of a given assignment of features from a parse. These probabilities become part of the default model for disambiguating alternative parses of a given input. When new sub-domain capabilities become available, new example sentences and sentence fragments are introduced to update the system's probabilistic parse model. In a second instance of machine learning, the invention exploits an unsupervised learning approach to concept clustering in order to build a representation of concept adjacency in the user focus. This map helps the system to recognize commonly related tasks and plans that may be unique to the user.

The design philosophy of the present invention and primary design goal is to provide a system that satisfies the user's goals, over a large array of potential goals, without requiring that the user provide complete or formal statements or indications of his goal. As a convention, we determine a single interpretation of the user's utterance, and execute the tasks that are indicated by that interpretation. By taking this approach, the system encourage users to use signals that are clear indicators of their intent. Thus, not only does the system learn from the user, the user learns to communicate effectively with the system. This system and method permits the user to pursue more than one goal at a time, to change the goal or focus within a goal.

A major design criterion of the system is the minimization of the information that a user must understand and provide in order to achieve his goals. For instance, in some cases, one could directly ask a user for information, rather than seeking to infer it from known plans, goals and context. The present system generally avoids this kind of required clarification unless the actions of any applicable plan have dangerous and/or irreversible consequences. Consistent with this approach, the system does not provide the user with an array of all of the potential interpretations of their inputs. Instead, the system always chooses one interpretation as the most likely meaning and offers that meaning back in a paraphrase to permit the user to observe the interpretation of his statement. Finally, with regard to "information overload", the present invention permits the user to set acceptable levels of verbosity in the system. A new user may want to see a paraphrase of every interaction, and to see every assumption that the system is making, both because he is uncertain about the system's ability to understand him, and because he seeks to learn which defaults the system assumes when personalized information is unavailable. An advanced user may only be interested in a paraphrase for an important, dangerous, or irreversible action, and may be confident that all of the important parameters used by the system are drawn from his profile. In a preferred embodiment, the invention uses a seven-element scale in this and many other parts of the user's profile: {Off/Zero, very low, low, medium, high, very high, and ON/Total}. Other scaling approaches can be used in alternative embodiments, including arbitrary numeric scales, such as a continuous scale from 0 to 1.

The invention architecture is predicated on an extension to the tripartite discourse model, which recognizes a distinction between discourse goals, problem-solving goals, and domain goals. This model permits incremental inference of likely user goals, beliefs, and plans throughout the discourse. Discourse level plans are directed at obtaining a goal via one or more rounds of communication with a (human or software) agent. These hierarchical, conditional, plans expect that agents will exchange information to introduce beliefs that cause actions that culminate in the accomplishment of some goal. Problem-solving goals are sub-goals that must be accomplished to achieve the larger domain goal. For instance, to obtain enough money for retirement (a domain goal), a user may ask for information about the financial performance of various investments, to satisfy the problem-solving goal of determining which of those investments is appropriate for him. At the discourse level, the same user might ask, "Can you tell me which investments are good for a retirement account?" The user intends that this speech act will cause his respondent to (a) believe that the user wants to be informed of those investments, and (b) that, as a consequence, the respondent should form a plan to inform the user of those investments, though the surface interpretation appears to be asking if the respondent is capable of providing such knowledge. It should be noted that the system architecture actually supports an N-partite model, as the agency responsible for much of the planning and plan representation is defined recursively. Should more elaborate planning schemes be required for some domain, the architecture of the preferred embodiment will support them.

The present system architecture supports a distribution of knowledge sources, so that it may be maintained by people familiar with the particular domain or sub-domain in question. At every opportunity, rather than transmitting a particular cluster of facts, the availability and location of such a cluster is transmitted, so duplication of knowledge can be postponed until it is needed. Aligned with this approach, each knowledge base supports an auto-loaded, cached style of fact maintenance, supported by periodic flushing of non-local knowledge.

Many of the central modules of the invention contain "mender" modules, such as the Input Mender, Discourse Mender, Plan Mender, Solution Mender, and Result Mender. These modules allow for arbitrary identification of specific error states and conditions, and for heuristic remediation of those states. Conceptually, this rule-based approach allows graceful degradation of system behavior when anomalous states occur.

Throughout the illustrative figures, arrows depicting information flow within in the preferred embodiment represent agent to agent conversations accomplished via KQML messages, which have the general structure:

```
(<performative>
:sender <sender id>
:receiver <receiver id>
:reply-with <reply with target id>
:in-reply-to <reply to target id>
:language <the language assumed in the content field>
:ontology <the ontology assumed in the content field >
:content (<content of message>))
```

A typical message within the system might be:

```
(ask-one
:sender sub-domain-agent-manager
:receiver stock-price-expert
:reply-with 147
```

:in-reply-to null
:language scheme
:ontology stock-world
:content ((price-of (stock-symbol-of "Lucent") "NYSE" "closing")))

Which asks for Lucent's price at the most recent closing of the New York Stock Exchange.

It should be noted that the same information and requests might be communicated via other messaging and representation systems, such as FIPA messages, or XML/DOM representation. Another convention used in the figures is that chevrons represent LTAG fragments while the use of parallelograms represent plan libraries. For a given sub-domain expert, the library includes plan operators for every capability that expert is capable of providing. These operators may include preconditions, parameters, descriptions, goals, and a specification of the way that success or failure should influence the belief system. For instance, a failure to find the Stock Exchange symbol for a company may allow one to conclude that it is not actively traded, and may indicate that it should not be included in a portfolio that is re-balanced periodically.

FIG. 1 refers to a high-level view of the entire system of the present invention. As indicated, all user inputs 101, are communicated through the User Interface Agency 102. This multi-agent group parses the input, passes the meaning to the Coordination Agent 104, uses and updates the system model 103, and communicates information back to the user at 101. The Coordination Agent 104 determines which capabilities and actions among various sub-domain experts (105, 106), will accomplish the current plan(s), what information must flow among those agents, what must be communicated back to the user, and causes appropriate tasks to be executed. It monitors the results, and transmits them to 102 as logical propositions and objects for discourse, such as graphs and tables. Each Sub-domain Expert (105, 106), communicates with one or more Information Adaptation Agents (107, 108) to accomplish a particular sub-domain task. An Information Adaptation Agent, such as 107, provides a "wrapper" around some area of functionality. For instance, the existing functionality may be a web page which contains recent stock quotes. The Information Adaptation Agent would transform those quotes into facts of the correct form embedded in messages bound for the sub-domain expert. Since some Existing Information Portals 109 and Existing Capabilities and Services 110 might change over time, 107 and 108 must monitor those resources, and develop new mappings when necessary. Sub-domain Knowledge Bases (111,112) hold relationships and facts relevant to a particular area and associated tasks. For example, the financial information Sub-domain Knowledge Base contains an axiom that a widely traded company has a stock exchange symbol, and that to determine the price of a share of stock in a given company, that stock exchange symbol must be used as an identifier. The information from (111, 112) is available directly to (105, 106), and indirectly to (104,102, and 103) thereby propagating "as needed" through that network. The Sub-Domain compendium 113 is a recursive counterpart to the top-level Domain Compendium (modules 104 through 113), indicating that the same structure and behavior might be used to accomplish tasks in a given sub-domain. A time-stamped, tagged, annotated history of all system interaction with the user, along with each interaction result, parse information, and the defaults and assumptions employed in the interpretation is passed to the Profile Agent 215 of module 103. Some of this information is transformed to new facts, and sent to into the World Model Agency, which implements a distributed knowledge base front end and makes the information available to the User Interface Agency and the Coordination Agency.

FIGS. 2 through 7 provide a more detailed view of the information flow among components of the IPE. All information flows in the figures except those between reference numeral 101 and reference numeral 102 or between reference numerals 107 and 109 or reference numerals 108 and 110, are accomplished via ACL messaging. This provides the system with great flexibility in allocating system functions to processors or clusters of processors.

Figure 2:
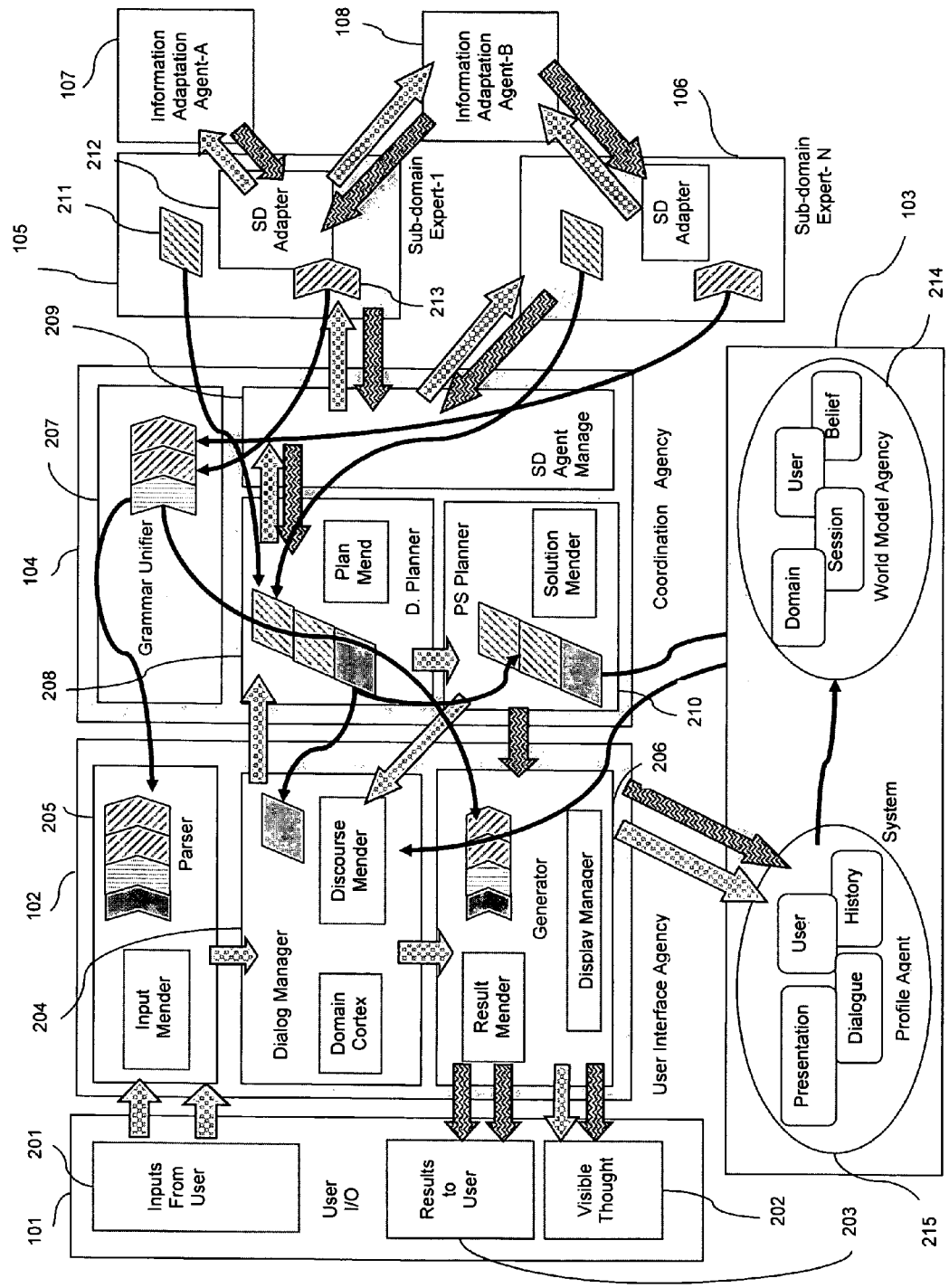
FIG. 2 shows the User Interface Agency, the Coordination Agency, and adjacent modules of the present invention.

In FIG. 2, the light gray checkerboard pattern arrows indicate information originated by the user, while the medium gray zig-zag pattern arrows indicate results or discourse elements generated by the system. The solid black arrows indicate flow of system information, facts, and grammar items. Inputs From the User 201 flow into the Parser Module 205 of the User Interface Agency 102. The input mender expands user-abbreviations, corrects likely errors such as misspellings, and coordinates diverse modes of input, such as text and cursor-selection. The spelling correction module can offer alternatives for frequently misspelled words, and for unrecognized words which are an edit distance of one correction from correctly spelled words. Words completely in uppercase, such as stock symbols will be assumed to be valid identifiers.

The parser parses the textual components, and produces a set of plausible parse trees. These trees, along with non-text parameters are sent to the Dialogue manager 205. The dialogue manager applies profile information, context, and proofs about plausible plans and intentions to determine the highest ranked interpretation of the users input. The best parse is communicated to the Domain Planner Module 208 of the Coordination Agency. The domain planner tracks the accomplishment of domain plans via a mixture of Sub-domain Experts (105, 106) and by the Problem Solving Planner 210, which accomplishes any domain tasks involving communication with the user. For example, the domain plan of withdrawing money from a savings account to invest in an index fund may not be accomplished without asking the user for his account number. The problem-solving planner communicates with the User Interface Agency 102, to accomplish this sub-task.

The User Interface Agency then determines how best to extract that information from the user. Particular domain-level tasks, which have all preconditions satisfied, are passed to the Sub-domain Agent Manager 209, which communicates the requisite tasks to one or more Sub-domain Experts (105, 106), monitors their progress, and determines when (if ever) to unilaterally terminate a task activity. Module 211 of Sub-domain Expert 105 contains a representation of the domain-level tasks involved in that can be accomplished in this sub-domain, along with preconditions, required parameters, and descriptions of the resulting data. Module 213 of Sub-domain Expert 105 contains portions of the grammar, which pertain to the tasks handled by that expert. For instance, in the case of a Company Information query Sub-domain, the grammar might translate a request for "fundamental analysis" to a series of tasks to obtain balance sheet data from a company's annual reports and quarterly statements, stock price information from a market source, and to use this information to compute various ratios and to compare them with industry benchmarks.

Figure 3:
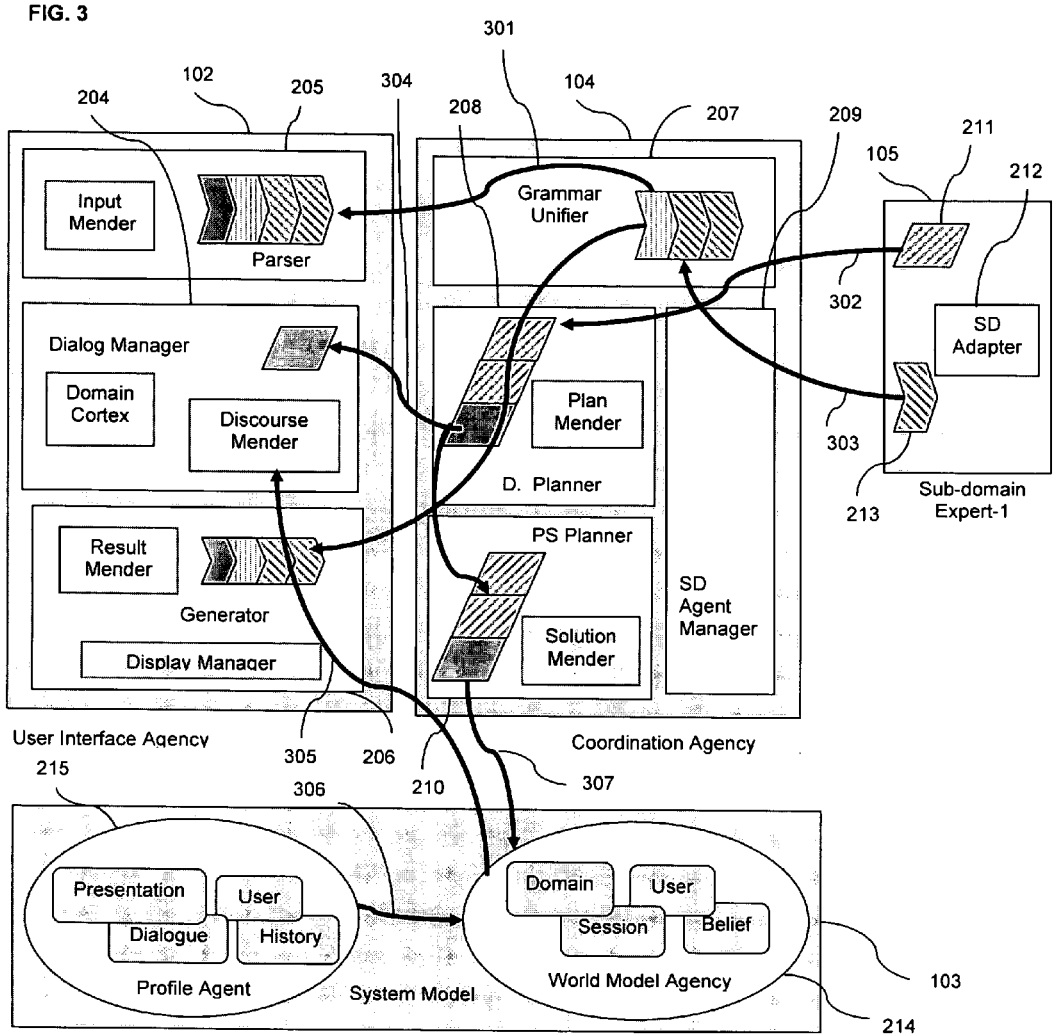
FIG. 3 depicts the propagation of lexical, grammatical, semantic, and model information from sub-domain experts.

FIG. 3 demonstrates the flow of lexical, grammatical, and semantic information from Sub-domain Expert 105. The following is an example message from 105 to 104, holding a new domain-specific lexical entry for the stock-selection idiom "mid cap":

(tell
   :sender Company-Investment-Selector
   :receiver Grammar-Unifier
   :language lexitem
   :content (idiom
   (qualifier ((adv. mid) (n. cap))
   (explicit (adv. middle) (np. (adv. market) (n. capitalization)))
   (plan (filter (investment-companies) mid-cap))
   (task (select ?X (investment-companies)
     (and (>market capitalization) $18)
      (<=market capitalization) $15B))))

Arrow 302 propagates facts about domain tasks, plans, and goals to the Coordination Agency Domain Planner 208. Arrow 303 propagates LTAG components 213 to the Coordination Agency Grammar Unifier 207. The Grammar unifier 207 combines all of the sub-domain grammar components. It also creates a "canonizing LTAG" for paraphrase generation. The twin goals of this grammar are to avoid ambiguous constructions, and to support a high degree of specificity in references. Because different sets of sub-domains might have different areas of overlap and ambiguity, this grammar cannot be created (or updated) until the component grammars have been collected.

Arrow 301 communicates the unified grammar to the Parser Module 205, where it is combined with the domain independent core grammar (solid gray chevron). Arrow 307 transmits facts about sub-domain tasks, plans, prerequisites, and parameters to the World Model Agency 214. Arrow 306 indicates the flow of facts which are derived from the users interaction with the system, such as user preferences, and the nature of result objects which have been captured in the user's history database.

Figure 4:
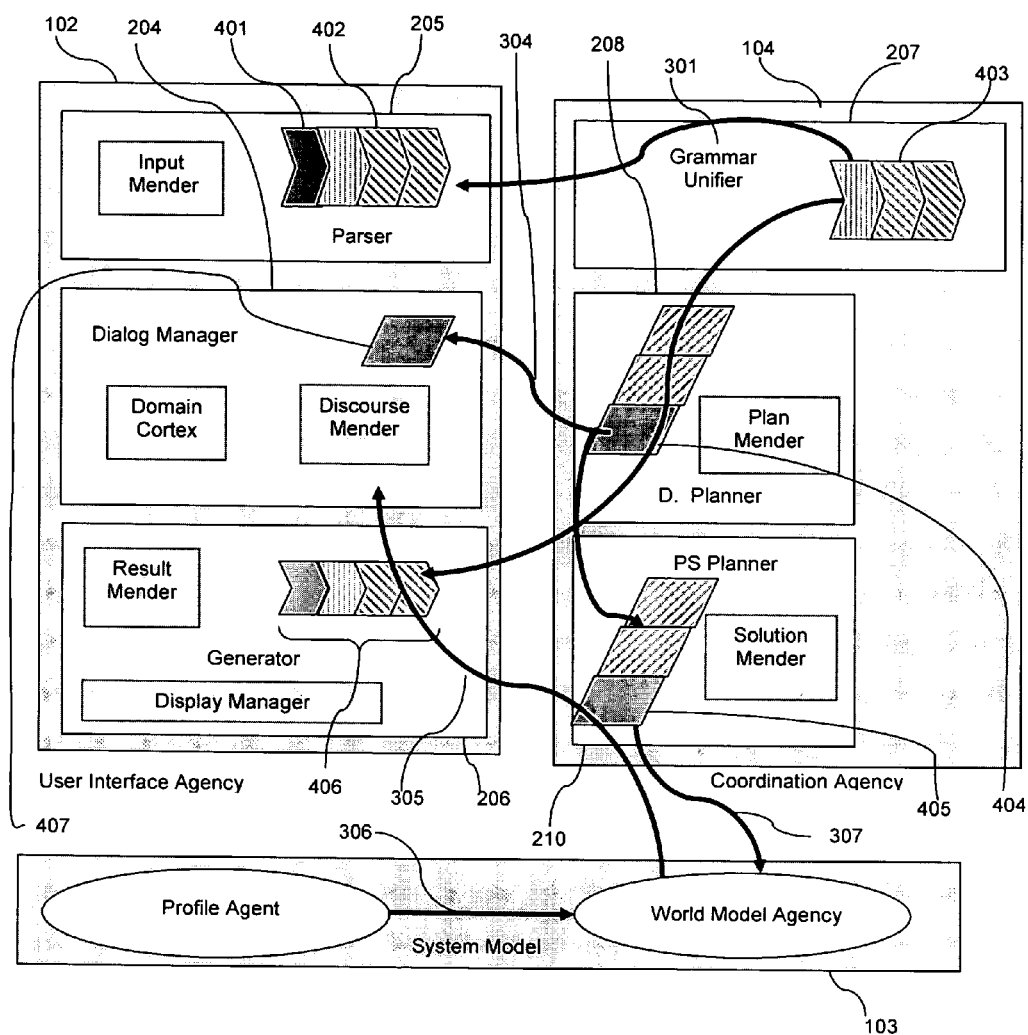
FIG. 4 shows the exchange of language and model information among the User Interface Agency, Coordination Agency, and System Model.

In FIG. 4., the solid gray chevron 401 represents a core domain-independent component of the grammar, while the lined chevrons, 402, represent sub-domain grammars which were combined by the Grammar Unifier, 207. The arrow 404 transmits the Canonizing LTAG 406 to the Generator module 206, while arrow 304 transmits plans corresponding to dialog actions. The following is an example message from 208 to 204, holding a plan corresponding to a dialogue action, in this case, the Domain Planner has not been able to find any midcap stocks of companies who are wineries, and asks the dialogue manager to achieve a plan to inform the user that the result of executing his plan is an empty result.

(achieve
   :sender DomainPlanner
   :receiver DialogManager
   :language I-planner
   :ontology education
   :content (plan
    (inform user
     (empty
      (plan (and (filter (investment-companies) mid-cap)
       (filter (investment-companies) (is winery))))))))

An English generation of this would be: "There are no wineries that are midcap stocks". Note that the Dialogue Planner is free to use other ways of informing the user. For instance, it might issue a plan to find the largest winery, then present the information as: "The largest winery, Robert Mondavi (MOND) has market capitalization of $300 M. It is not a midcap stock".

Figure 5:
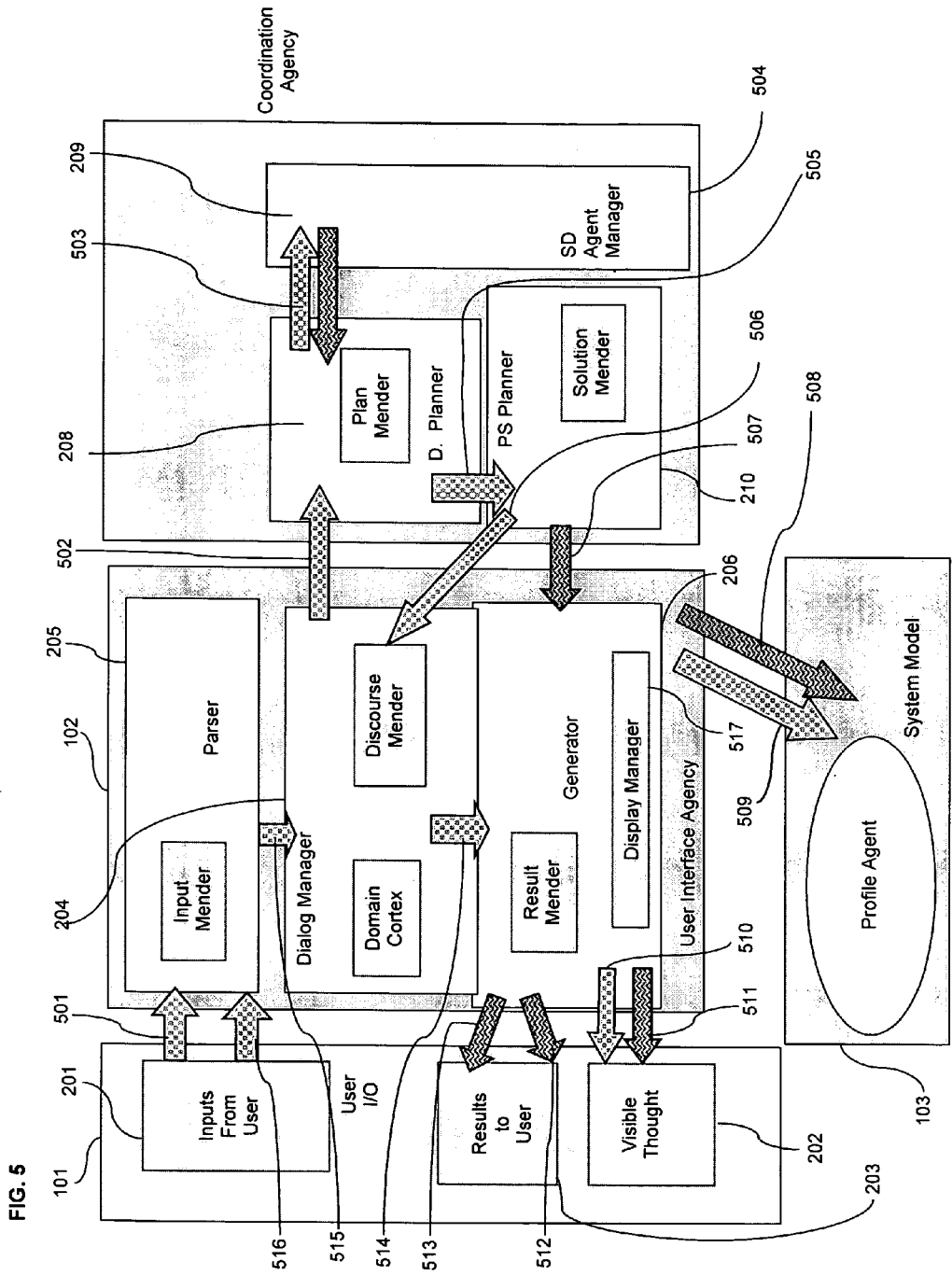
FIG. 5 demonstrates the flow of control initialized by user actions to the Coordination Agency, and the flow of results back to the user interface.

FIG. 5. demonstrates the flow of requests and results through the system. Arrows 501 and 516 represent user signals, such as speech, typing, or gestures that communicate some request or facts to the Parser Module 205. Arrow 515 transmits alternative parse trees corresponding to the user input to the dialogue manager. The dialogue manager applies knowledge about constraints, preconditions of plans, recent focus of dialogue, and user preferences to help it score the parsers. The scores used reflect the systems estimation for the likelihood that a given parse, along with slot fillers from the System Model 103, reflects the intentions of the user. Helping to score alternate parses, the domain cortex is a self-organizing map of clusters of goals and tasks, and orderings. This map is initially constructed from a body of example sentences, but is later adapted via unsupervised learning of user-specific functional clusters. For example, the tasks "investigate company's financial position", "add the company to a (hypothetical) portfolio", followed by "add the company to a real portfolio", can often cluster together in the sequence given. On the other hand, it would be unusual to first buy a given equity, then investigate its solvency.

In a preferred embodiment, the domain cortex consists of a two-layer representation, "from" and "to", of commonly associated states and parameters. Not only are related concepts clustered, but related transitions among states are clustered, allowing common backbone sequences to emerge in the representation. It should be noted that the domain cortex also provides a mechanism for responding to ill-formed input. The system can attempt to match any well-formed components of such input against the domain-cortex clusters, and assume the meaning that most nearly matches the ill-formed input. Such repairs will always be noted in system interaction, so that the user does not assume that ill-formed input is, in fact completely acceptable. Arrow 502 transmits the top-ranked interpretation of the input to the Domain Planner 208. Arrow 514 shows the transfer of the semantic representation of user signals to the Generator module, where it is paraphrased. Arrow 503 shows tasks issued by the domain planner communicated to the Sub-domain Agent Manager 208. Results, in the form of axioms or non-textual objects, are communicated back through the system, starting with arrow 504. These results reach the Problem Solving Planner 210, which communicates them to the generator module 206.

The problem solving planner may have completed a subplan, in which case the results are communicated, via arrow 507 to the Generator Module 206, or it may need to obtain subsequent information to complete the plan, typically referring to the user's input, via arrow 506 to the Dialogue Manager 204. The dialog manager may obtain information from the user via generated speech acts. Arrows 508 and 508 from the User Interface Agency 102 to the system Model 103 depict the transmission of annotated history and of the interaction to the Profile Agent 215. Arrow 510 depicts the transmission of paraphrases of the user input to the Visible Thought module 202, while 511 carries a depiction of the major current working assumptions of the system to the same destination. The visible thought module 202 portrays an annotated list of the system's interpretation of the user's words or signals, along with a representation of the current working hypotheses of the system.

Because the paraphrase is more specific than typical user input, the user may choose to cut paraphrased text out of the Visible Thought module 202, edit it (textually or verbally) and re-submit the sentence as a correction of the original. For instance:

User1: "Show me a list of the large cap manufacturers"

Paraphrase1: "Display a list of the names of manufacturing companies which have outstanding shares worth more than $15B"

The user may really be interested in companies that have a higher capitalization, and modify the sentence as:

User2: "Display a list of the names of manufacturing companies which have outstanding shares worth more than $30B"

In the preferred embodiment, the user may select items from this display to "strengthen" or "weaken" a belief. For instance, if the user sees that Visible Thought module 202 displays P3.1: Remove the stock known as EDS from 2000-07-19.R2.

A3.5: User Preferences: support user dislikes EDS, p=0.55

In this case, the user may not really dislike EDS, he may, in fact, be trying to determine how much value EDS adds to the portfolio, thus, the user might select assumption A3.5, and weaken its strength to zero (based on the present systems seven-element scale).

Still regarding FIG. 5, arrows 512 and 513 depict text and multimedia results sent to the user, as directed by the Display Manager 517, which uses a model of system capability, ideal presentation, and user preference to determine the best combination of presentation vehicles to portray information. The Display Manager 517 also enforces user preferences with regard to the verbosity and quantity of references in the Visible Thought display 202.

Figure 6:
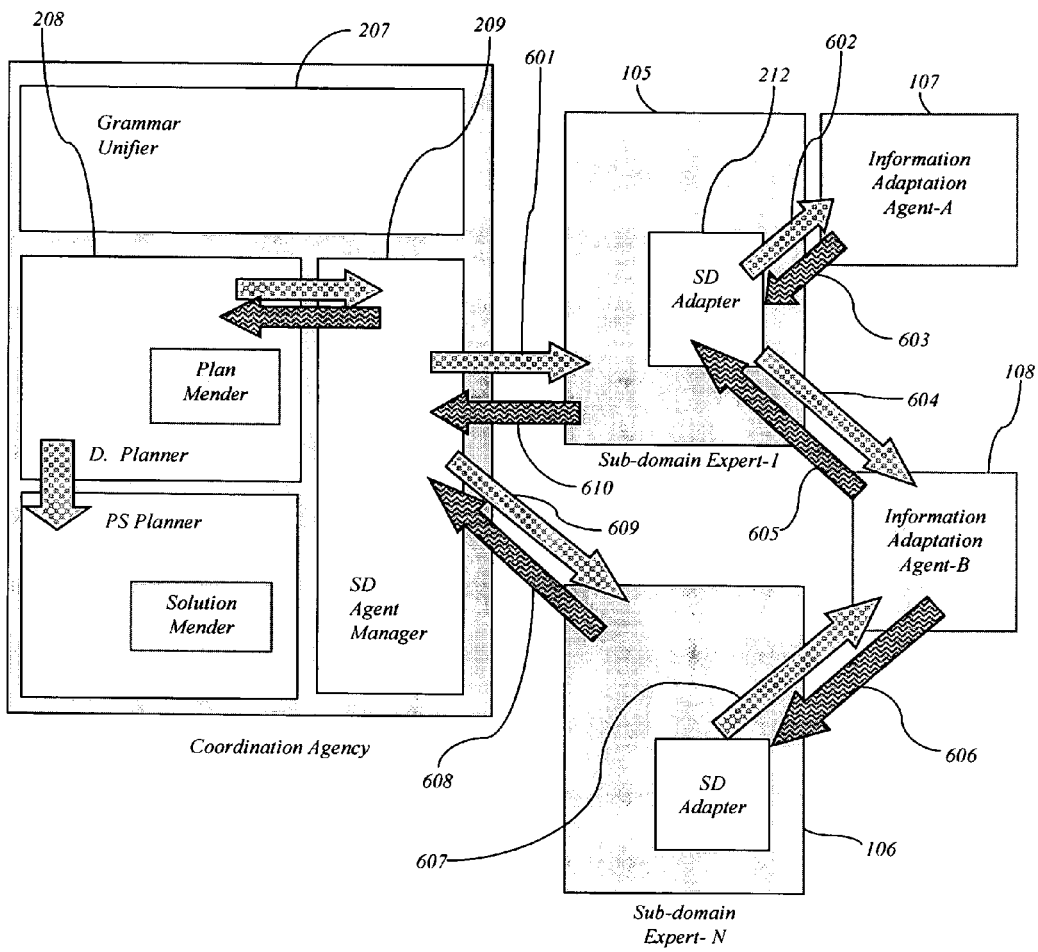
FIG. 6 demonstrates the flow of control and results among the Coordination Agency, Sub-domain experts, and the Information Adaptation Agents.

While FIG. 5 concentrates on information and strategies that inform the user, FIG. 6 is devoted to the mechanisms that accomplish tasks which are needed to satisfy user requests.

FIG. 6 depicts the flow of communication between the Coordination Agency 104, and the Sub-domain Experts (105, 106). The Sub-domain Expert Manager 209 acts as a matchmaker, and sets up correspondence arrows (601, 609) to the appropriate sub-domains for a given interaction. The Sub-domain Experts (105, 106) may be able to accomplish tasks directly, or may require interaction with one or more outside information sources. This interaction is initiated via messages along arrows 602, 604 and 607, which impinge on Information Adaptation Agent-A 107, and Adaptation Agent-A 108. These Information Adaptation agents, which serve to translate arbitrary protocols to the ACL message format used within the preferred embodiment, send their results back to 105 and 106 via arrows 603, 605, and 606.

While the components mentioned so far are chiefly concerned with understanding the user's goals and accomplishing the tasks which will achieve them, the components of the system model 103 are devoted to maintain all that is known about the user in relationship to the domain.

Figure 7:
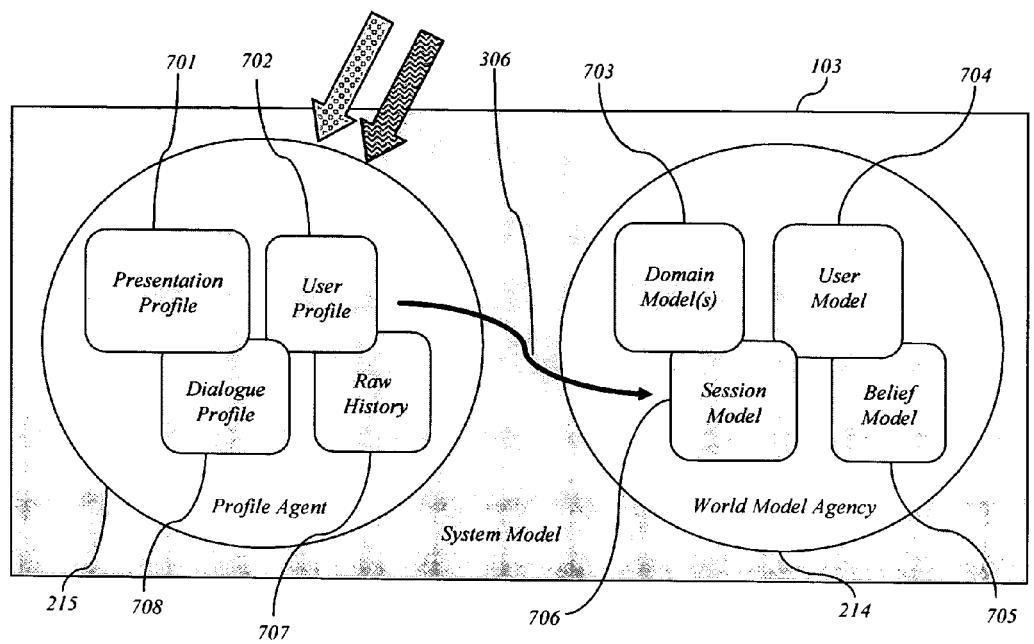
FIG. 7 shows the flow of historical information and user parameters into the system model, and the resulting addition of new knowledge to the world model agency.

FIG. 7 depicts the system model, which serves as a universal repository of knowledge for the present invention. The Profile Agent 215 mediates access to all of the raw information captured by the system's interaction with the user. The Presentation Profile 701 holds user preferences regarding the presentation of the data. An example of this preference would be the user's choice to display all graphs as separate windows. The Dialogue Profile 708 maintains user choices about levels of verbosity, interaction thresholds, trust or distrust of the system interpretation. For instance, a "trusting" user may choose to filter out most paraphrases, and view only the system assumptions that directly support actions that are very dangerous. The User Profile 702 maintains user-specific parameters that are to be used in default reasoning of the system. An example of one such parameter would be "investment capital". Initially, all of these defaults hold the value pair (typical-user $30,000), where $30,000 is the value of a typical user for that parameter. As the user exercises various facets of the system, the default values get replaced by (clustered-user high-end-users $300,000) as the system dynamically classifies user preferences, or by (personal-user $157,000), in the case that a parameter has become known via direct indication by the user (e.g. he answers a question or volunteers the information). The Raw History 707 contains an annotated list of all interaction with the system, including user signals, paraphrases, assumptions, and results. Each of the 215 modules maintains data as ordinary text files (with descriptions to external binary objects such as pictures of graphs)—so that the users may manually review or modify the content. As the profile agent records user preferences, parameters, and objects of historical reference, it simultaneously creates facts that are transmitted to the World Model Agency 204, via arrow 306. The World Model Agency provides local access to several local and non-local knowledge sources. Recall that, as stated earlier, the system typically propagates only pointers to some facts rather than the facts themselves. Thus, though the world model agency provides access to Domain Model(s) 703, typically these models reside remotely, and are maintained in parallel with the sub-domain experts. The Domain Models hold static knowledge about the relationships and operations available within specific domains. The Session Model 706, Belief Model 705, and User Model 704 are maintained locally. The Session Model maintains facts about the current session and the current focus of interaction with the user. The User Model 704 maintains a three of the five-fold descriptions of the user: (typical-user, clustered-user, and personal-user). These facts become available to the dialogue manager and help to disambiguate alternative interpretations. The Belief Model 705 maintains a representation of the system's view of the user's (likely) beliefs. Many user requests and statements influence this representation and the system supports a variety of methods to (re)compute the weights on (likely) beliefs when new evidence is acquired.

Figure 8:
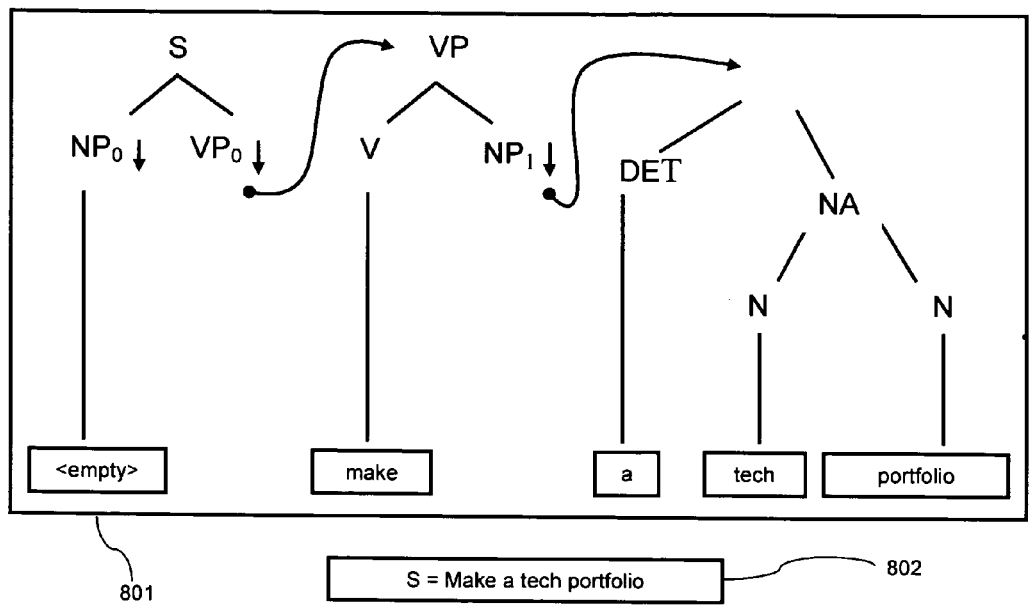
FIG. 8 shows a graph of the Tree Adjoined Grammar representation of an example sentence.
Figure 9:
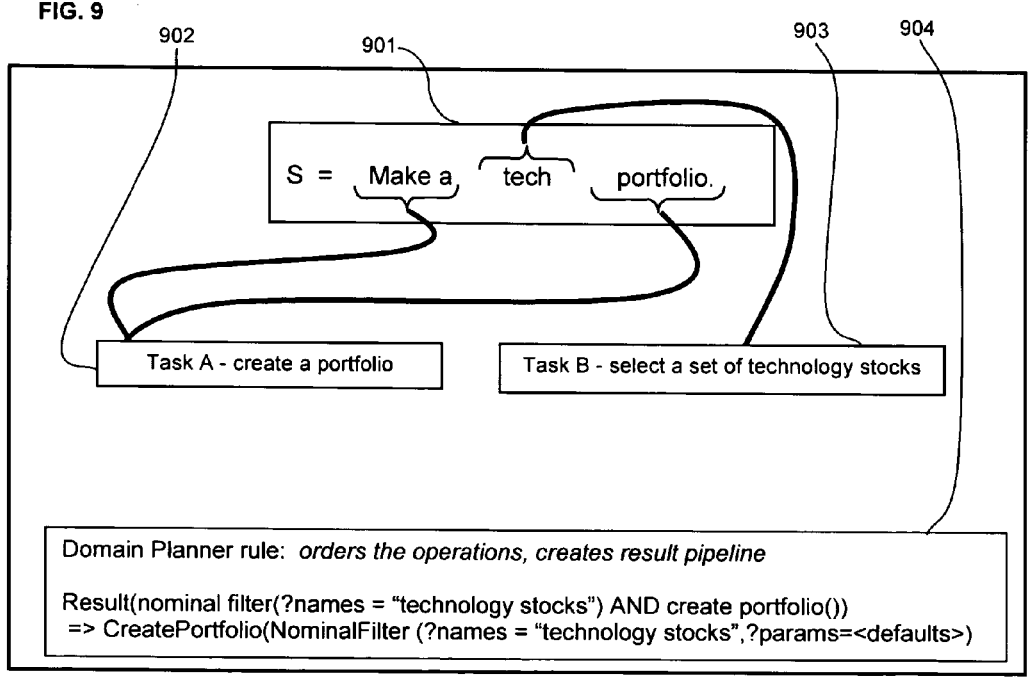
FIG. 9 demonstrates a rule used to accomplish a task spanning two sub-domains.

Through FIG. 7, it has been shown how the language and semantics from sub-domains can be propagated and joined to provide language understanding on the domain level, how user signals may be interpreted to find their most likely meaning, how the system can accomplish user goals by planning and achieving actions in the three linked domains of discourse, problem-solving, and domain actions, and how results may be transmitted and combined from various sub-domain experts, through the discourse manager to the user. FIGS. 8 and 9 focus on the structure of the representation of a sentence in the grammar and the related representation created by the domain planner.

FIG. 8 depicts a fragment of a tree-adjoined grammar 801 in a system that parses the sentence "make a tech portfolio" 802. The down arrow in each tree fragment represents a branch that is to be substituted by some tree with a matching label. In some cases, the empty string may match a label. Lexicalized grammars associate tree fragments with some lexical item such as an "anchor" that provides a handle to retrieve the appropriate grammar fragment during a parse. Additional constraints may be specified for a particular anchor and grammar fragment to enforce various language consistency rules.

FIG. 9 depicts the type of rule which is invoked to achieve results over multiple domains. The original sentence, "Make a tech portfolio" 901 results in two high-level tasks, "create a portfolio" 902, and "select a set of technology stocks" 903. The result from creating a portfolio of ALL stocks then selecting the technology ones from it would be unsatisfactory, as portfolios involve optimization of non-additive functions. Additionally, this would be a very inefficient way to construct a collection of stocks. Thus the domain-planner must supply a rule that orders these operations. In addition, the planner specifies the way that results from one operation are to be used by another.

EXAMPLES

Figure 10:
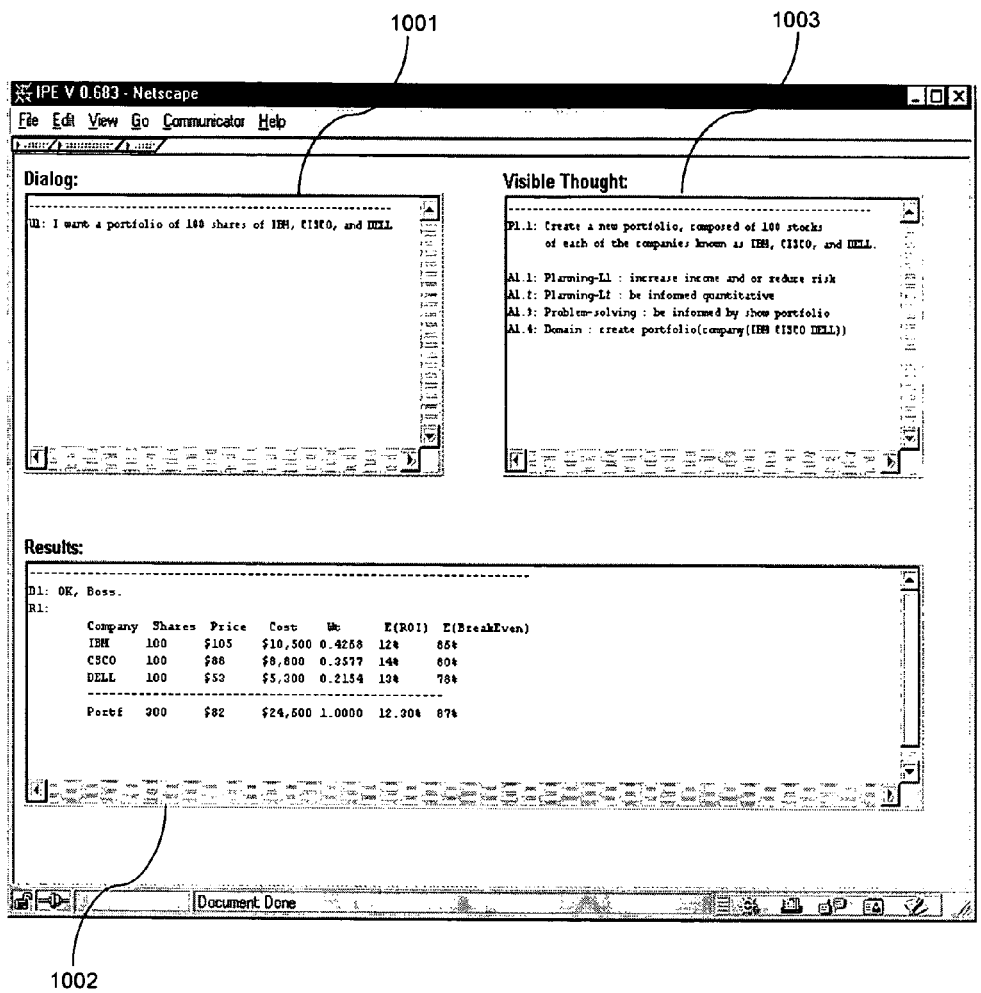
FIG. 10 demonstrates UI and system behavior for "I want a portfolio of 100 shares of IBM, CISCO, and DELL".

The following examples are representative and in no way should be construed as limiting. FIG. 10 depicts one round of interaction with the invention. Into the Dialog box 1001, the system has prompted "U1" and the user has typed "I want a portfolio of 100 shares of IBM, CISCO, and DELL". The Visible Thought window 1003 shows items which conveyed the invention's interpretation of the user's statement. P1.1 is a paraphrase of the user's statement, in language that was acceptable to the system. In a preferred embodiment, paraphrases not only communicate that the system understands the user's intentions, but they also demonstrate more specific, less ambiguous forms of language. Typically, the user learns how to "force" a given interpretation by adding more qualifiers to his input. Also in box 1003, several assumptions comprised the top "working hypotheses" of the system.

A1.1: Planning-L1: increase Income and or reduce risk
refers to a high-level plan which is common to almost all financial-domain operations.

A1.2: Planning-L2: be informed quantitative
refers to a user's presumed plan to gain quantitative information, which should help him achieve Planning-L1.

A1.3: Problem-solving: be informed by show portfolio
depicts the way the system solves the problem of giving the user quantitative information which will support his increased income or reduced risks referred to in A1.1.

A1.4: Domain: create portfolio (company (IBM CISCO DELL))
shows a leaf-level domain plan involving only the portfolio sub-domain expert.

It should be noted that the number of items in the Visible Thought window 1003 is controlled by several user parameters. The paraphrase depends on the user's paraphrase threshold level, which may vary from "do not paraphrase anything" to "paraphrase everything". The number level and verbosity of assumptions is similarly affected by a parameter that chooses how much of the systems "beliefs" about the user intent should be displayed and in what detail. In some cases, the user may wish to see every fact that the system has assumed, in others, he may be interested in only the top-level assumptions. In yet other cases, controlled by a separate parameter, the user may only be interested in changes of assumptions at a given level. (E.g. when did the system change from the assumption of "retirement planning" to the assumption of "saving for education"?)
Results box 1002 demonstrates a dialog element issued by the system
D1: OK, Boss. R1:
As well as a tabular result the system intended to give the user relevant quantitative information.

| Company | Shares | Price | Cost | Wt | E(ROI) | E(BreakEven) |
|---|---|---|---|---|---|---|
| IBM | 100 | $105 | $10,500 | 0.4268 | 12% | 86% |
| CSCO | 100 | $88 | $8,800 | 0.3577 | 14% | 80% |
| DELL | 100 | $53 | $5,300 | 0.2154 | 13% | 78% |
| Portf | 300 | $82 | $24,600 | 1.0000 | 12.30% | 87% |

It should be noted that tabular results, such as this, are also subject to user parameters that select the volume of information and format of the display.

Figure 11:
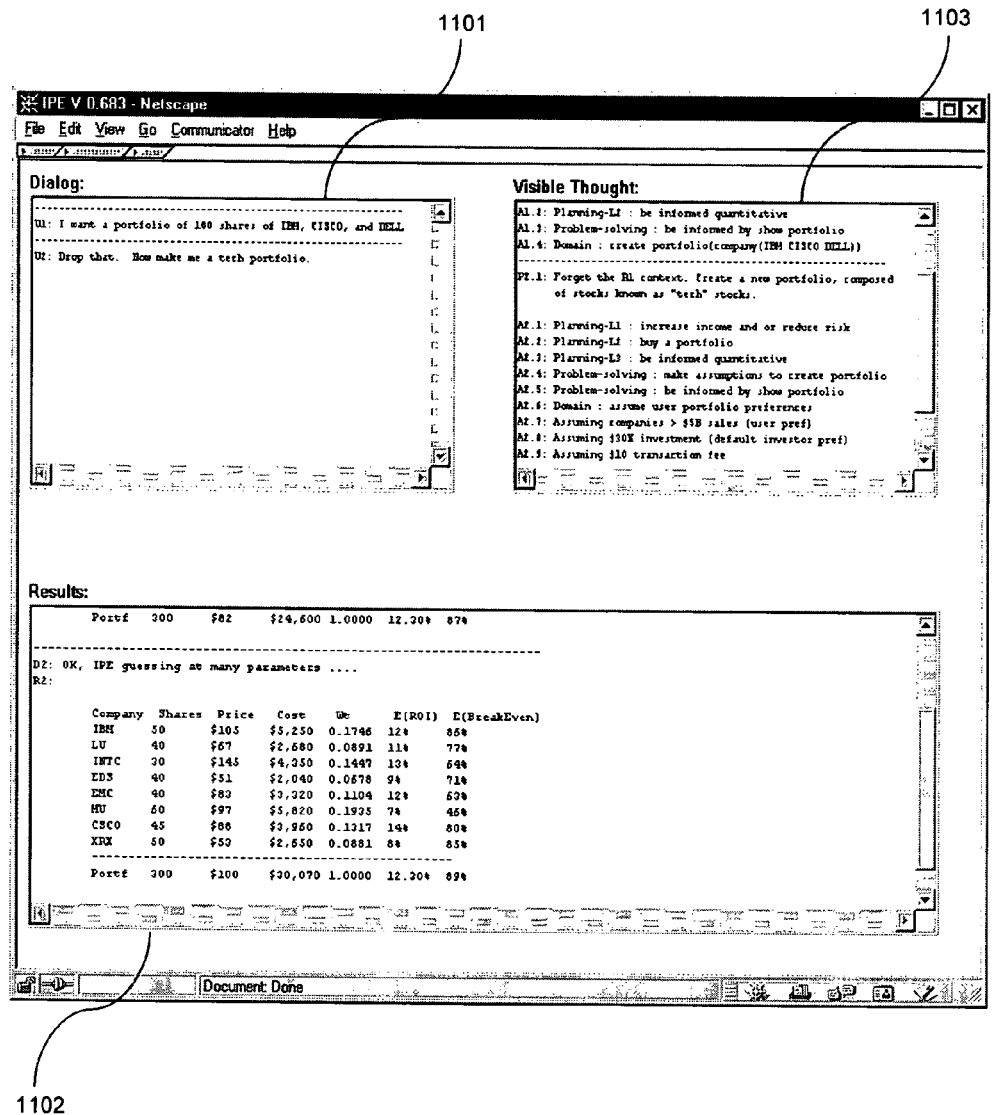
FIG. 11 demonstrates UI and system behavior for "Drop that. Now make me a tech portfolio".

FIG. 11 depicts a subsequent interaction, starting with the user statement in box 1101:
U2: Drop that. Now make me a tech portfolio.
The resulting paraphrase in box 1103 was:
P2.1: Forget the R1 context. Create a new portfolio, composed
of stocks known as "tech" stocks.

New assumptions A2.1 . . . A2.9 are also added to the window marked 1103. Note especially that parameters needed are taken from user preferences or investor defaults. This is mentioned in the system dialog of box 1102:
D2: OK, IPE guessing at many parameters . . . .
Also displayed in 1102 was the resulting table that satisfies the user's request.

Figure 12:
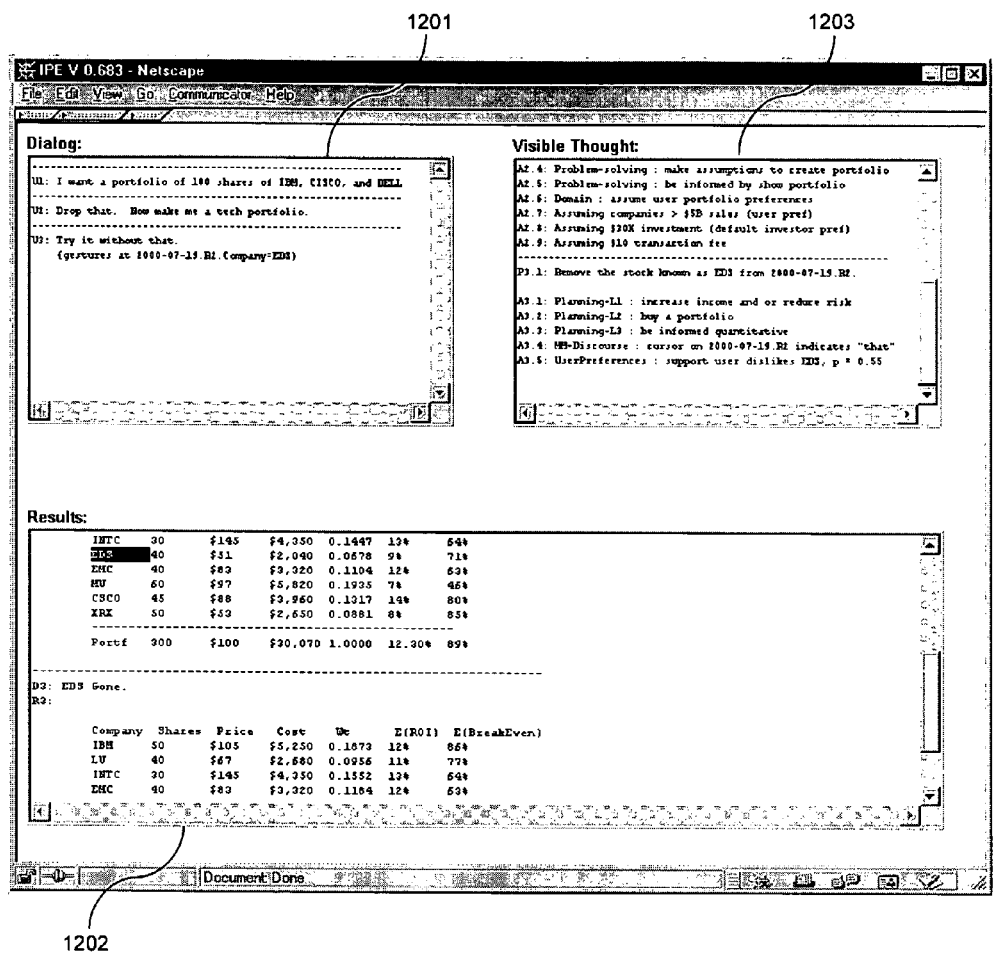
FIG. 12 demonstrates UI and system behavior for "Try it without that {gestures at 2000-07-19.R2.Company=EDS}".

FIG. 12 shows a multimodal anaphoric reference by the user to an element of the previous result. The user has selected a text field containing the string "EDS" from box 1202, while simultaneously entering
U3: Try it without that.
into box 1201. This combined input indicated that "that" refers to the selected text string "EDS" in result table R2. It should be noted that any method for selection of an item could be substituted for this selection, including, but not limited to, manual pointing, selecting via eye position and/or focus, selection by pedal action, selection by tongue position, or selection by voluntary stimulation of particular nerve complexes which are connected to monitoring transducers. Any and all of these selection actions would contribute the same semantic content to the user's discourse.
Box 1203 shows a paraphrase of the user's inputs:
P3.1: Remove the stock known as EDS from 2000-07-19.R2.

Figure 13:
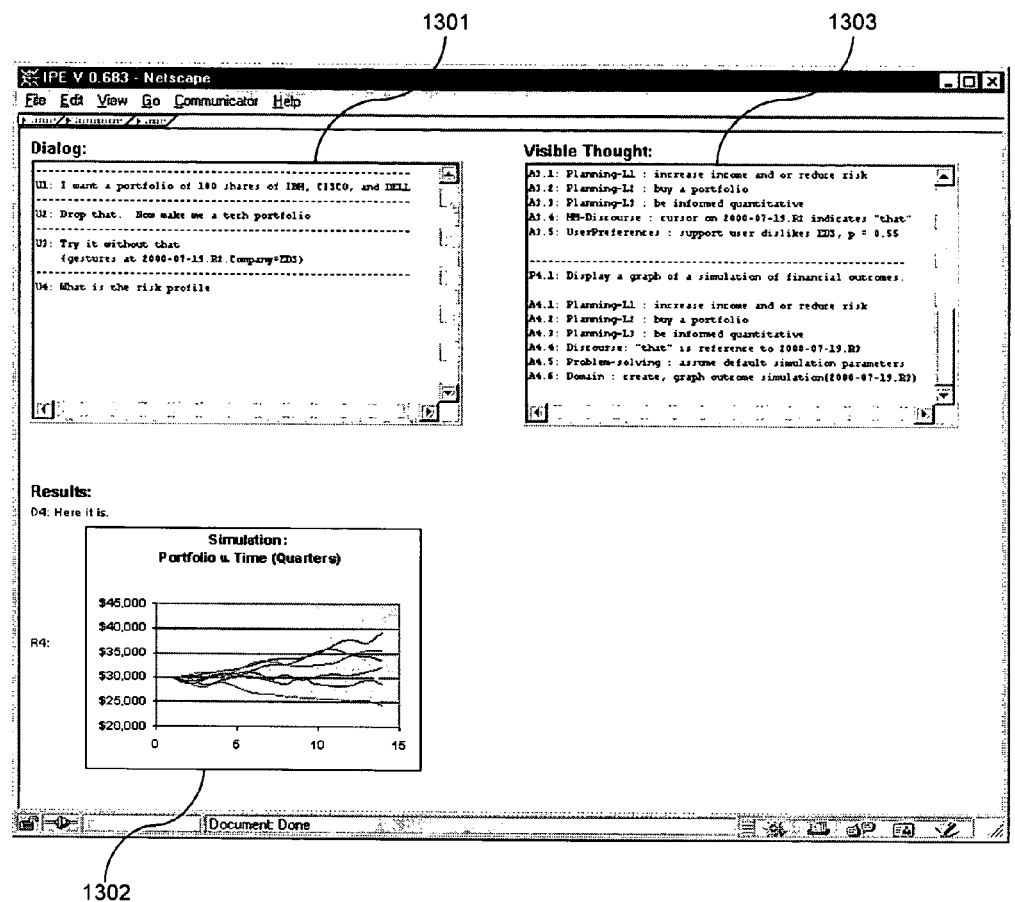
FIG. 13 demonstrates UI and system behavior for "Can I see the risk profile".

Note that the gesture was replaced by its reference, and that the result table has been fully qualified. This result can be extracted from the user's history and re-used at a later time and context. Box 1203 also shows new assumptions added to the system as a result of this exchange. Note especially assumption:
A3.5: UserPreferences: support user dislikes EDS, p=0.55
The user has an opportunity to select this assumption, which indicates an slight dislike for EDS, and to correct it if it is in error. He may be removing EDS from the portfolio merely because he is interested in seeing how much EDS contributes to the resulting financial outcomes, perhaps even to make a case for the inclusion of EDS. This feature of visible thought renders the invention potentially much more useful than interaction with a human expert, as the system provides greater default transparency into its rationale than is available with a human respondent.
FIG. 13 box 1301 depicts a user's utterance:
U4: What is the risk profile
This is interpreted as a request to view a graphical result from a simulation of the probable financial outcomes of the portfolio result R3: A pointer to the results of this simulation will be included in a history of the session.
Visible Thought box 1303 displays the system's interpretation of the users query, and box 1302 shows the resulting graph, which depicts potential financial states over the next 4 years.
FIG. 14 shows a text file of a history of interaction with the system, note that each element of a round of communication is integrated, and that the user can retrieve items of this history for later use or modification. All non-text result items are tagged by reference to external documents and/or generators that can re-express those items in the system to the appropriate output channels. Histories and defaults from expert users are captured, aggregated, generalized, and packaged as recipes for accomplishing given tasks. These recipes are stored as state/transition clusters forming an initial version or alternate version to the domain context of the naive user.

FIG. 15 depicts the major alternative locations for placing various large blocks of the system on multiple processors or multiple clusters. The dotted lines each depict a separate functionality that may be implemented on a separate computer or cluster of computers. Virtually any combination of associations of these functionality's are reasonable, in some commercial context. For instance, Ref. 1501 might be implemented on a local laptop, while 102, 103, 104, 105, 107,110, 103, 105, and 112 might be implemented on a remote server. Considering just the main module types, the number of major combinations, given a sufficient number of processing nodes, is at least the powerset of 9, which is $2^9=512$ combinations. In actuality, the agent architecture gives us even more flexibility than this, every single individual module of FIG. 2 might be implemented on a separate processor, or a separate cluster, resulting in approximately 268,000,000 alternative allocations to computing facilities. In addition, for load-balancing purposes, it may be advantageous to distribute a single function over several processors or processing clusters, resulting in a even more alternative configurations. Thus, the architecture of the current invention permits a great deal of flexibility in allocation of functionality to computing nodes, the only pre-requisite is that all nodes are accessible via network messaging.

FIGS. 16 and 17 show two examples of belief calculus approaches that can be used to compute the likelihood of a given conclusion, given some evidence. Though, in the preferred embodiment, qualifiers in user input are mapped into a seven element scale, other terms in the system may be known with more precision. The belief calculus must be able to accept and provide numeric estimations of likelihood, which are (or are converted to) values on the continuous interval from zero to one.

FIG. 16 shows 1603, a rule that computes our belief that a substance is coffee, given 4 tests. Each test is characterized by strength (how much it reduces the remaining uncertainty, if the test is known to be completely true) and a necessity (how much it reduces the certainty, if the is known to be completely false). The rationale of the example goes something like this, a substance is somewhat more likely to be coffee if we find it in a mug, or if it is a hot liquid, but cold liquids in non-mug containers can also be coffee. On the other hand, if the liquid is not brown, it is very likely not coffee, and if it is tea [(?X is not tea) is false] then we are very sure it is not coffee, thus the final two clauses have large necessity weights. In example A., we compute $B_4$, given that we know all of the premises to be completely true. In example B., we compute the strength of belief in the conclusion, given that we are 100% sure of each of each of the premises, except for the third premise, which we are only 50% sure of. Note that if we were 0% confident that the substance was not tea, then we would be 0% confident that is coffee.

FIG. 17 shows a fragment of a bayesian belief network. This approach to computing likelihood is appropriate when some mixtures of base and conditional probabilities are available. Additionally, these probabilities an be learned, from data, over a period of time. The example shows likelihoods for "planning for retirement", given that a user has asked about mutual funds.

Figure 18:
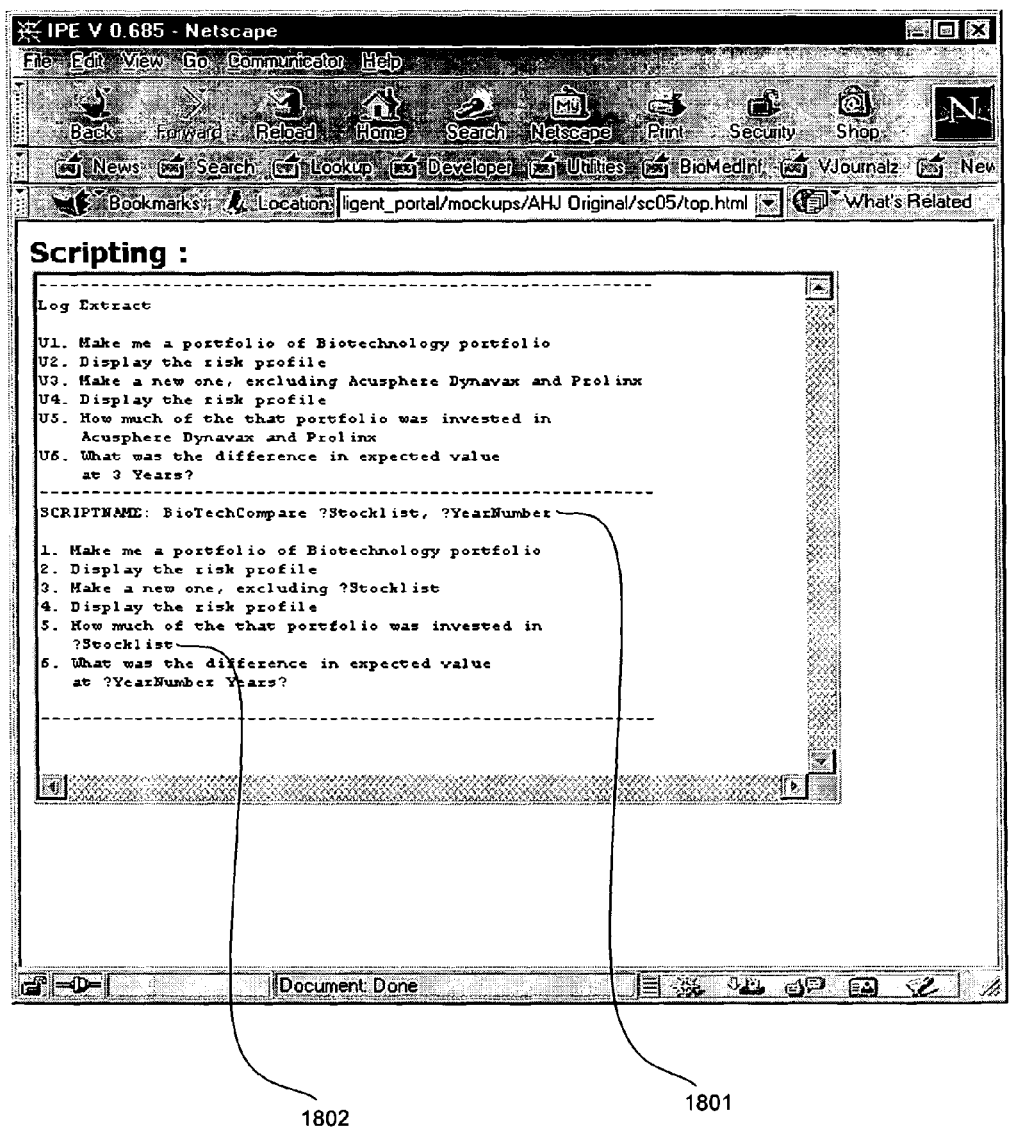
FIG. 18 shows a scripting example.

FIG. 18 shows an example of script creation. First, user statements are captured from the session log. Next, constants occurring in the collected lines are replaced by variables. Finally a named script is generated, which requests values for the variables (unless they can be inferred from context) and performs the appropriate operations in sequence. FIG. 18, Ref. 1801 is an example of a parameter to a user script, which must be bound at the time the script is executed. Ref. 1802 shows how the variable, "?Stocklist" has taken the place of the constant list, "Acusphere Dynavax and Prolinx" in the original log. Named scripts become accessible to the user, via the User Model section of the World Model Agency FIG. 3, Ref. 214. Scripting also provides an easy mechanism for sharing expert techniques with users. As they are identified, particularly useful scripts can be converted to full-fledged domain plans, or to the potential actions of sub-domain experts.

One promising area of current research is in probabilistic LTAGS, which allow probabilities to be introduced directly into the LTAG system. These might be considered as an alternative to the two-pass (parse and disambiguate) model that we use in the preferred embodiment, this would require a dynamic update of tag probabilities to match the discourse context. As an alternative to the LTAG approach, Head-driven Phrase Structure Grammar (HPSGs) might provide good results for some languages as would approaches based on Augmented Transition Networks (ATNs). These grammar formalisms can be (semi-) automatically translated, so it is possible to move much of the grammar from one form to another with little effort. The XTAG system employs a parser based on Earley's algorithm, but other parsing strategies might be used, including: chart parsers, recursive-descent parsers, bottom-up parsers, head-corner parsers, as well as Left-to-right scanning, Leftmost derivation (LL) parsers, Left-to-Right scanning with Rightmost derivation (LR) parsers, and Look-Ahead, Left-to-Right scanning, Rightmost derivation (LALR) parsers. Other, pure learning based, pattern-matching systems might also, eventually, offer reasonably good grammar building and parsing mechanisms. For instance, inductive logic programming has been used to learn a natural language grammar from a corpus of example language. In the area of multi-agent systems platforms, many technology alternatives are available, including FIPA-OS, and Zeus. As a substitute for our knowledge representation system, many existing approaches might be employed, including various modal logic and truth maintenance systems. Rather than using KMQL or FIPA style messages, XML representation and DOM[1] protocol might eventually offer greater interoperability. In any case, translations among the various messaging systems are being developed, eventually making these choices less restrictive. Rather than a bi-layer model of the domain cortex, an N-layer model would permit greater specificity of sequences. This extension might be useful in domains where long recurring sequences of operations are the common. There are many potential alternatives to the belief calculus methods sketched in FIG. 16 and FIG. 17, including, but not limited to: Dempster-Schafer evidence calculations; MYCIN-style certainty factors; Dragoni-Giorgini belief revision functions; Fuzzy-Logic inference; and Bonissone's bounded uncertainty inference method. These methods vary greatly in their assumptions, and requirements, and they can easily be used in concert, as different approaches are required to simulate human reasoning, and to accommodate differing levels of a priori probability estimates.

It has been shown how a distributed knowledge base comprising the concepts, tasks, and language for a domain can be coordinated and utilized to provide an intelligent multimodal interface to the functionality of that domain, allowing users to avail themselves of all of the capabilities and knowledge of that domain. The invention has been shown to provide the capability to decompose a given domain to any required level of granularity, representing the salient facts, language, and parameters for that sub-domain. It has been shown how a discourse model may be applied to this system, and how it can encompass multimodal and multimedia interaction between the user and the system. Additionally, it has been shown how the invention can execute some putative plans or tasks in parallel, to determine their feasibility, to aid in interpretation of the inputs which suggest them. The multimodal N-partite discourse model, as represented in the preferred embodiment, has been shown to permit inference of users goals, plans, and beliefs; to permit improved estimation of those elements over the course of an interaction; and to determine when a new user mental context, such as a changed plan, is in place. It has been shown how a user-specific concept cluster representation can help identify likely focus, defaults, and changes to plans.

The system and method described above is shown to provide a scaleable, robust platform for combining lexical, grammar and semantic elements automatically, and for determining subsets of the combined grammar for the purpose of generating unambiguous interpretations of parses. The preferred embodiment of the invention has been shown to accept ill-formed input, which may exhibit flaws of spelling, grammar, or logic. It has been described how the invention can learn parameters from a population of users to allow it to supply appropriate defaults parameters, and how the history of interactions of expert users can be cast as a template for neophytes. It has been demonstrated a scheme for tagging, archiving, and combining various elements of multimodal multimedia discourse, along with working hypotheses, for unambiguous reference. The system and methods described above have been shown to reveal to the user the incremental working suppositions on which it bases its interpretation, and to allow the user to directly correct or support those suppositions. It has been shown how one or more methodology of belief calculus can be used, as appropriate, to estimate likely plans and goals of users in general, particular subsets of users, and of a single particular user. It has also been shown how user interactions may form the basis of abstraction and generalization via scripting, and how scripts might be made by expert users, and then distributed to less experienced users. Finally, it has been demonstrated how this invention provides the ability for a user to explore and to exploit a large body of capability and knowledge easily without specialized training.

We claim:

1. A method for performing at least one task using execution of a software component out of a plurality of software components on a computing device for at least one user involving at least one domain, the method comprising:
representing by the computing device at least one user goal with respect to the domain, the goal represented being independent of tasks which the plurality of software components can perform;
representing by the computing device at least one task which can be accomplished by the software component in the domain independent of stated user goals;
establishing by the computing device an association between at least one linguistic or pragmatic item and the at least one user goal, the at least one linguistic or pragmatic item having an association with the task;
inferring by the computing device using the associations that the software component which can accomplish the at least one task is appropriate out of the plurality of software components for achieving the at least one user goal; and
performing the at least one task for the user by the computing device executing the software component.

2. The method of claim 1, further comprising inferring by the computing device parameters of the software component, using the associations.

3. The method of claim 1, wherein the software component provides the at least one linguistic or pragmatic item corresponding with the task.

4. The method of claim 1, wherein said establishing an association between the at least one linguistic or pragmatic item and the at least one user goal comprises employing at least one model of the user with respect to the domain.

5. The method of claim 1, wherein inferring by the computing device using the associations that the software component which can accomplish the at least one task is appropriate comprises:
attempting to perform two or more tasks, using two or more software components, or using two or more sets of parameters;
rating feasibility of the two or more tasks and the software components and the parameters; and
ranking the software components or the parameters or the tasks by feasibility.

6. The method of claim 1, further comprising:
obtaining signals from the at least one user by the computing device; and
maintaining by the computing device, a user profile to supply default information or bindings; and
wherein the model of the user includes at least one perspective comprising: expert, typical-user, clustered-user, personal-user, session, or focus; and
wherein defaults are maintained with respect to at least one perspective comprising expert, typical-user, clustered-user, personal-user, session, or focus.

7. The method of claim 1, further comprising:
maintaining by the computing device a history for establishing an association between the domain and user goals and between the domain and system tasks; and
predicting by the computing device a likely domain for association with a next user goal, using the associations in the history.

8. The method of claim 1, further comprising modeling domains, by the computing device, by combining models which represent sub-domains, including composing the linguistic or pragmatic items and the tasks associated with the domains by collecting those items and tasks from corresponding sub-domains.

9. The method of claim 1, further comprising inferring by the computing device, at least one task, one or more parameters, and the software component by inferring at least one item comprising user goals, intentions, beliefs, assumptions, preferences, or changes of state from a series of discourse transactions.

10. The method of claim 1, further comprising inferring by the computing device at least one user goal incrementally from elements of discourse including:
representing by the computing device, at least one terminological, ontological, lexical, grammatical, or idiomatic item of focusing information with respect to the at least one domain;
recording by the computing device, a history of transactions and the user goal associated with the transactions;
updating by the computing device, a representation of the user goals by increasing the likelihood of the user goals that are consistent with the transactions and by decreasing the likelihood of the user goals that are inconsistent with the transactions; and generating by the computing device, a most likely meaning of subsequent user signals using the updated representations.

11. The method of claim 1, further comprising annotating by the computing device, a history of user inputs and system outputs of the computing device, with at least one annotation comprising:
- a paraphrase of a user input,
- an interpretation of a user input,
- a set of working assumptions held by the computing device, or
- changes of assumptions held by the computing device.

12. The method of claim 11, further comprising making the annotation available to the user by the computing device, and providing by the computing device a mechanism for the user to change the paraphrase, or the interpretation, or the working assumptions.

13. The method of claim 1, further comprising maintaining a history of user inputs or paraphrases of the inputs, by the computing device, and collecting by the computing device, a series of inputs or paraphrases for automatically forming at least one script.

14. The method of claim 1, further comprising:
- maintaining by a computing device, a history of user inputs or paraphrases of the inputs;
- collecting a series of inputs or paraphrases of the inputs by the computing device for automatically forming at least one script;
- providing a mechanism to the user by the computing device for naming or designating the script; and
- providing a mechanism by the computing device for invoking the script by name, or selection, or by at least one signal.

15. The method of claim 1, further comprising constructing by the computing device, a map of domain adjacency by:
- maintaining by the computing device a history that reflects the domain associated with user inputs and with system outputs of the computing device;
- counting by the computing device transitions from one domain to another; and
- learning by the computing device, the likelihood of an interaction from one domain being followed by an interaction with the same domain or with a different domain.

16. The method of claim 1, further comprising providing a mechanism to the user, by the computing device, for choosing values of variables at a time of an invocation of at least one script or determining by the computing device values of variables from a user profile at the time of an invocation of the at least one script.

17. The method of claim 1, further comprising maintaining, by the computing device, a dynamically updated weight to reflect a change of transitions over time.

18. The method of claim 1, wherein the at least one user goal comprises intentions, beliefs, assumptions, preferences, or changes of state.

19. The method of claim 1, wherein the at least one linguistic or pragmatic item comprises vocabulary, grammar, idioms, parameters, goals, or assumptions.

20. A computer system, comprising:
- means for representing at least one user goal with respect to a domain;
- means for representing at least one task for a software component, which task can be accomplished in the domain independent of stated user goals;
- means for establishing an association between at least one linguistic or pragmatic item and the user goal, the at least one linguistic or pragmatic item having an association with the at least one task;
- means for inferring, using the associations, that the software component is appropriate for achieving the at least one user goal, using the associations; and
- means for distributing the representation of the user goal, the representation of the task, the associations, an inference, or a performance of the task through execution of the software component among processing resources of the computer system.

21. The system of claim 20, further comprising means for inferring parameters for executing the software component to perform at least one task for the user, using the associations.

22. The system of claim 20, wherein the software component is configured to provide the at least one linguistic or pragmatic item corresponding with the task.

23. The system of claim 20, further comprising means for inferring the software component or one or more parameters for performing the task for the user including:
- means for attempting to perform two or more tasks, using two or more sets of parameters;
- means for rating feasibility of the tasks and the parameters; and
- means for ranking the parameters or the tasks by feasibility to determine the parameters or task.

24. The system of claim 20, wherein the means for establishing an association between the at least one linguistic or pragmatic item and the at least one user goal comprises means for employing at least one model of the user with respect to the domain.

25. The system of claim 24, further comprising means for maintaining a user profile for supplying default information or bindings; and
wherein:
- the model of the user includes at least one perspective comprising expert, typical-user, clustered-user, personal-user, session, or focus; and
- defaults are maintained with respect to at least one perspective comprising expert, typical-user, clustered-user, personal-user, session, or focus.

26. The system of claim 20, further comprising means for modeling domains by combining models which represent sub-domains, wherein the linguistic or pragmatic items and the tasks associated with the domains are composed by collecting items and tasks from corresponding sub-domains.

27. The system of claim 20, further comprising means for maintaining a history to associate the domain with user goals and with system tasks and means for using the associations in the history to predict a likely domain for association with a next user goal.

28. The system of claim 20, further comprising means for inferring at least one user goal incrementally from elements of discourse including:
- means for representing at least one terminological, ontological, lexical, grammatical, or idiomatic item of focusing information with respect to the domain;
- means for recording a history of transactions and the user goals associated with the transactions;
- means for updating a representation of the user goals by increasing the likelihood of the user goals that are consistent with the transactions, and by decreasing the likelihood of the user goals that are inconsistent with the transactions; and
- means for using the updated representation to generate the most likely meaning of subsequent user inputs.

29. The system of claim 20, further comprising means for annotating a history of the user inputs and system outputs with at least one annotation comprising:
a paraphrase of the user input,
an interpretation of the user input,
the set of working assumptions held by the system, or
changes of assumptions held by the system.

30. The system of claim 29, further comprising means for making the annotation available to the user, and means for providing a mechanism for the user to change the paraphrase, or the interpretation, or the working assumptions.

31. The system of claim 20, further comprising:
means for maintaining a history of user inputs or paraphrases of the inputs;
means for collecting a series of inputs or paraphrases of the inputs for automatically forming at least one script;
means for providing a mechanism to the user for naming or designating the script; and
means for providing a mechanism for invoking the script by name, or selection, or by at least one signal.

32. The system of claim 20, further comprising:
means for maintaining a history of user inputs or paraphrases;
means for collecting a series of inputs or paraphrases of the inputs for automatically forming at least one script; and
means for replacing one or more constants within the script with variables.

33. The system of claim 32 further comprising means for providing a mechanism to the user for choosing values of variables at the time of an invocation of the at least one script or means for determining values of variables from a user profile at the time of an invocation of the at least one script.

34. The system of claim 20, further comprising means for constructing a map of domain adjacency including:
means for maintaining a history that reflects the domain associated with user inputs and with system outputs;
means for counting the transitions from one domain to another; and
means for learning the likelihood of an interaction from one domain being followed by an interaction with the same domain or with a different domain.

35. The system of claim 20, further comprising means for maintaining a dynamically updated weight to reflect a change of transitions over time.

36. The computer system of claim 20, wherein:
the at least one user goal comprises intentions, beliefs, assumptions, preferences, and changes of state; and
the at least one linguistic or pragmatic item comprises vocabulary, grammar, idioms, parameters, goals, and assumptions.

37. An article of manufacture, comprising:
a storage medium; and
a plurality of programming instructions stored in the storage medium and configured to cause an apparatus, in response to execution of the instructions by an apparatus, to perform operations associated with inferring at least one meaning of a user's actions with respect to a software component out of a plurality of software components for at least one user involving at least one domain, the operations comprising:
representing at least one user goal with respect to the domain, the goal represented independent of tasks which the plurality of software components can perform;
representing at least one task which can be accomplished by the software component in the domain independent of stated user goals;
establishing an association between at least one at least one linguistic or pragmatic item and a meaning of the user's actions, the at least one linguistic or pragmatic item having an association with the task;
establishing an association between the at least one linguistic or pragmatic item and the user goal;
inferring, using the associations, that the software component which can accomplish the at least one task is appropriate out of the plurality of software components for achieving the at least one user goal; and
performing the at least one task by executing the software component using at least one association to infer the meaning of the user actions with respect to the software component.

38. The article of claim 37, wherein the software component provides the at least one linguistic or pragmatic item corresponding with the task.

39. The article of claim 37, wherein said establishing an association between the at least one linguistic or pragmatic item and the at least one user goal comprises employing at least one model of the user with respect to the domain.

40. The article of claim 39, wherein the operations further comprise conducting discourse transactions with the user, the conducting including:
receiving signals from the user through at least one communication channel; and
generating signals to the user through at least one communication channel;
wherein said establishing an association between the linguistic or pragmatic item and the user goal comprises employing a model of discourse transactions.

41. The article of claim 40, wherein the operations further comprise inferring at least one task, a parameter and the software component by inferring at least one item, the item comprising user goals, intentions, beliefs, assumptions, preferences, or changes of state, from a series of discourse transactions.

42. The article of claim 40, wherein the operations further comprise inferring at least one user goal incrementally from elements of discourse including:
representing at least one terminological, ontological, lexical, grammatical, or idiomatic item of focusing information with respect to the at least one domain;
recording a history of transactions and the user goals associated with the transactions;
updating a representation of the user goals by increasing the likelihood of the user goals that are consistent with the transactions and by decreasing the likelihood of the user goals that are inconsistent with the transactions; and
generating the most likely meaning of subsequent user actions using the updated representation.

43. The article of claim 39, wherein:
the operations further comprise maintaining a user profile to supply default information or bindings;
wherein:
the model of the user includes at least one perspective comprising expert, typical-user, clustered-user, personal-user, session, or focus; and
defaults are maintained with respect to at least one perspective comprising expert, typical-user, clustered-user, personal-user, session, or focus.

44. The article of claim 39, wherein the operations further comprise maintaining a history for reflecting the domain associated with the at least one user goal and the at least one task.

45. The article of claim 39, wherein the operations further comprise modeling domains by combining models which represent sub-domains, including composing the linguistic or pragmatic items and the tasks associated with the domains by collecting of those items and tasks from corresponding sub-domains.

46. The article of claim 39, wherein the operations further comprise constructing a map of domain adjacency by:
- maintaining a history that reflects the domain associated with user actions and with system inferences;
- counting the transitions from one domain to another; and
- learning the likelihood of an interaction from one domain being followed by an interaction with the same domain or with a different domain.

47. The article of claim 46, wherein the operations further comprise inferring the software component or parameters to perform the task for the user by comparing the history of user actions and system inferences with a map of domain adjacency.

48. The article of claim 39, wherein operations further comprise obtaining a user action which has been accepted by some other software system, and is conveyed from the other software system as an information tuple, a file, as a stream of data, as a database entry, or as an electronic signal.

49. The article of claim 37, wherein the operations further comprise:
- inferring the software component or one or more parameters for performing the task for the user by:
  - attempting to perform two or more tasks, using two or more software components, or using two or more sets of parameters;
  - rating the feasibility of the tasks and the software components and the parameters; and
  - ranking the software components or the parameters or the tasks by feasibility.

50. The article of manufacture of claim 37, wherein:
- the user goal comprises intentions, beliefs, assumptions, preferences, or changes of state; and
- the at least one linguistic or pragmatic item comprises vocabulary, grammar, idioms, parameters, goals, or assumptions.

* * * * *

UNITED STATES PATENT AND TRADEMARK OFFICE
CERTIFICATE OF CORRECTION

| | | |
|---|---|---|
| PATENT NO. | : 8,027,945 B1 | |
| APPLICATION NO. | : 11/503826 | |
| DATED | : September 27, 2011 | |
| INVENTOR(S) | : Elad et al. | |

It is certified that error appears in the above-identified patent and that said Letters Patent is hereby corrected as shown below:

Column 1, line 2, below "Title" insert -- CROSS-REFERENCE TO RELATED APPLICATIONS --.

Column 25, lines 62-67, in Claim 20, delete "A computer system, comprising: means for representing at least one user goal with respect to a domain; means for representing at least one task for a software component, which task can be accomplished in the domain independent of stated user goals;" and insert -- A computer system, comprising: means for representing at least one task for a software component, which task can be accomplished in the domain independent of stated user goals; means for representing at least one user goal with respect to a domain, the at least one user goal represented being independent of the at least one task for the software component; --.

Column 27, line 28, in Claim 33, delete "claim 32 further" and insert -- claim 32, further --.

Column 27, line 45, in Claim 36, delete "computer system" and insert -- system --.

Column 27, line 52, in Claim 37, delete "a storage medium;" and insert -- a non-transitory storage medium; --.

Column 28, lines 1-2, in Claim 37, delete "between at least one at least one linguistic" and insert -- between at least one linguistic --.

Column 30, line 14, in Claim 50, delete "of manufacture of" and insert -- of --.

Signed and Sealed this
Nineteenth Day of June, 2012

David J. Kappos
*Director of the United States Patent and Trademark Office*